(12) United States Patent
Audet et al.

(10) Patent No.: US 8,259,997 B2
(45) Date of Patent: Sep. 4, 2012

(54) REAL-TIME TRACKING SYSTEM

(75) Inventors: Dominic Audet, Montreal (CA);
Quentin Bleton, Montreal (CA);
Vincent Pasquier, Montreal (CA)

(73) Assignee: Moment Factory, Montreal (CA)

( * ) Notice: Subject to any disclaimer, the term of this patent is extended or adjusted under 35 U.S.C. 154(b) by 628 days.

(21) Appl. No.: 12/502,077

(22) Filed: Jul. 13, 2009

(65) Prior Publication Data
US 2011/0007942 A1    Jan. 13, 2011

(51) Int. Cl.
*G06K 9/00* (2006.01)
(52) U.S. Cl. ..................................... 382/103
(58) Field of Classification Search .............. 382/103, 382/107, 181, 199, 203, 209, 216, 218; 342/52–54; 250/338.1, 338.2, 339.02, 339.14, 349, 345, 250/347, 363.02, 363.03, 392; 348/169, 348/171, 172; 356/3, 3.01, 3.03, 3.09, 3.1, 356/3.11, 27, 152.2
See application file for complete search history.

(56) References Cited

U.S. PATENT DOCUMENTS

| | | | | |
|---|---|---|---|---|
| 4,252,025 | A * | 2/1981 | Robinson | 73/621 |
| 4,495,816 | A * | 1/1985 | Schlumberger | 73/600 |
| 4,847,688 | A | 7/1989 | Nishimura | |
| 5,414,474 | A | 5/1995 | Kamada | |
| 6,009,755 | A * | 1/2000 | Manome et al. | 73/602 |
| 6,081,619 | A | 6/2000 | Hashimoto | |
| 6,605,807 | B2 * | 8/2003 | Safai | 250/341.1 |
| 7,129,886 | B2 * | 10/2006 | Hall et al. | 342/28 |
| 2006/0152404 | A1 * | 7/2006 | Fullerton et al. | 342/28 |
| 2007/0024487 | A1 * | 2/2007 | Zemany et al. | 342/22 |
| 2008/0278730 | A1 * | 11/2008 | De Lega | 356/497 |

OTHER PUBLICATIONS

Chambers et al ("Waivelet Processing of Ultra Wideband Radar Signal"), Antenna and propagation problems of Ultrawideband radar, IEEE Collaquium, Jan. 12, 1993.*
Website: http://www.rieglusa.com/software-guide/mobile.shtml, visited Dec. 17, 2009.
Website: http://www.rieglusa.com/software-guide/riprocess_mobile.shtml, visited Dec. 17, 2009.

* cited by examiner

*Primary Examiner* — Jason M Repko
*Assistant Examiner* — Shervin Nakhjavan
(74) *Attorney, Agent, or Firm* — Baker & Hostetler LLP

(57) ABSTRACT

There is provided a real-time tracking system and a method associated therewith for identifying and tracking objects moving in a physical region, typically for producing a physical effect, in real-time, in response to the movement of each object. The system scans a plane, which intersects a physical space, in order to collect reflection-distance data as a function of position along the plane. The reflection-distance data is then processed by a shape-analysis subsystem in order to locate among the reflection-distance data, a plurality of discontinuities, which are in turn associated to one or more detected objects. Each detected object is identified and stored in an identified-object structure. The scanning and processing is repeated for a number of iterations, wherein each detected object is identified with respect to the previously scanned objects, through matching with the identified-object structures, in order to follow the course of each particular object.

85 Claims, 13 Drawing Sheets

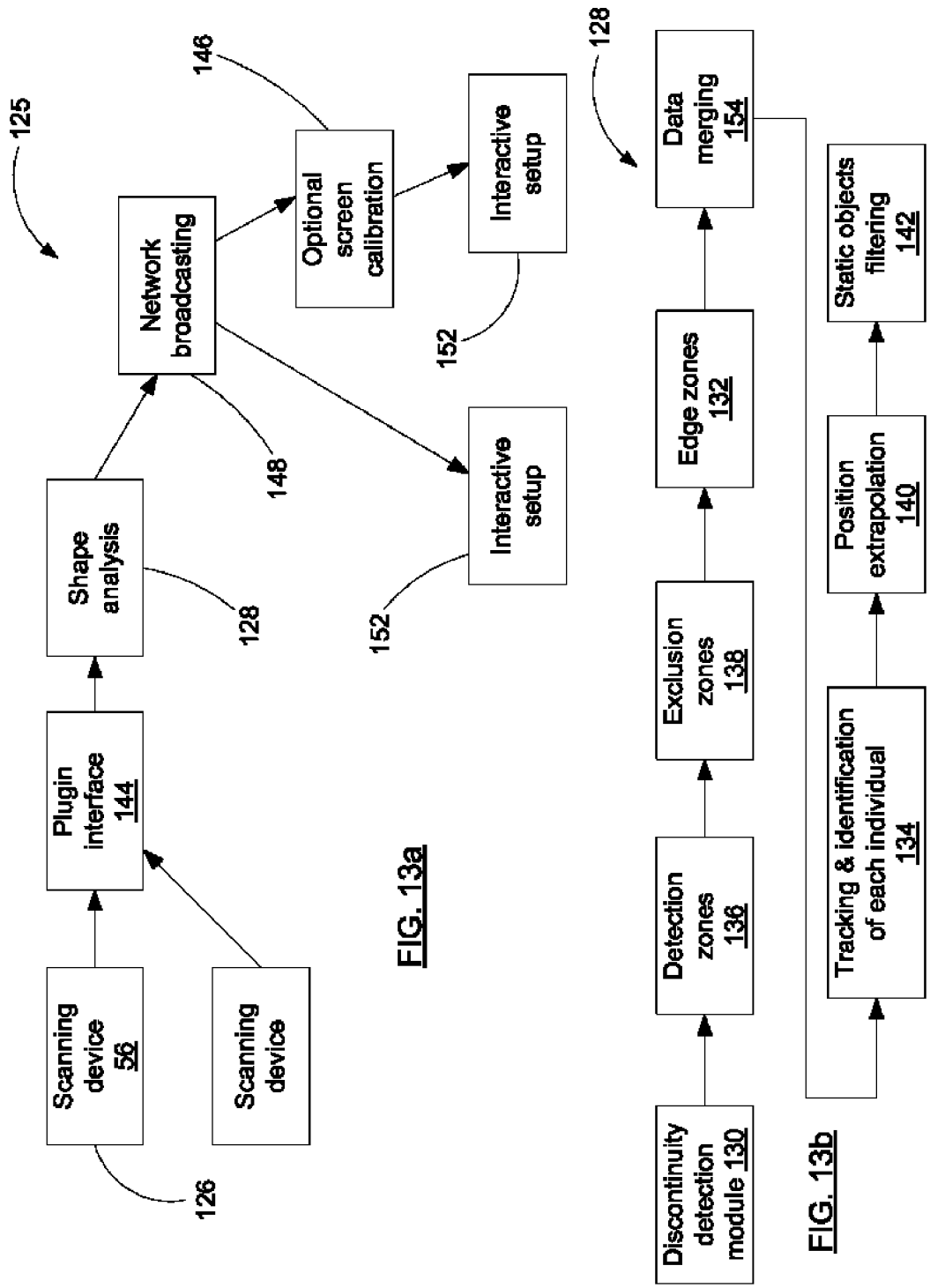

REAL-TIME TRACKING SYSTEM

FIELD OF THE INVENTION

The present invention relates to a real-time tracking system. More particularly, the present invention relates to a real-time tracking system for tracking one or more objects, to an apparatus including the same, as well as to a method associated thereto

BACKGROUND OF THE INVENTION

Known in the art are detection systems for detecting an object in a physical environment, and in some cases, detecting a movement thereof. Conventional detection or tracking systems usually use a camera for capturing images and process the images in order to obtain data related to the object. Such data processing of images requires complex algorithms and presents a number of limitations and challenges. For example, such systems are highly sensitive to color, texture, etc. of the object being tracked. Moreover, movements of a person may result in a changing appearance due to light reflection and shading, and associating parts of an object having different colors may present additional challenges. Furthermore, the presence of visible substances such as gases, fog, smoke, confetti, snow, etc. is known to interfere with the image capture. The same applies in low-light environments.

Moreover, conventional tracking systems are generally low-precision tracking systems, namely used for security purposes and generally directed to detection of motion and/or mere presence. As such, systems known in the art are namely detection systems rather than tracking systems. Furthermore, conventional tracking systems are also limited in the amount of data to be processed. Indeed and for example, a camera-based system processes the same amount of data, usually a high number of pixels, irrespective of the number or size of objects to be detected. Moreover, typical camera based systems require positioning the camera at a certain distance with respect to the objects to be detected and the desired area to be detected. Also, the distance of the camera with respect to the objects may interfere with the focus level of the image being captured.

Furthermore, typical applications for tracking or detection systems are usually not critically dependent on time, that is, the time of processing may be relatively long or slightly delayed with respect to the moving object or person being tracked or detected, without incidence on the desired result. Indeed and for example, with a conventional security system, the output may be provided a few seconds after the corresponding movement or presence of the physical object. Moreover, conventional tracking or detection systems are not configured to keep track of undetected objects 38 being hidden either behind another object or which are out of range with respect to the detection field.

Known to the Applicant are U.S. Pat. No. 4,847,688 (NISHIMURA et al.); U.S. Pat. No. 5,414,474 (KAMADA et al.); and U.S. Pat. No. 6,081,619 (HASHIMOTO).

NISHIMURA et al. is directed to a "moving body recognition circuit having a function in which a moving body is correctly recognized by having the body automatically separating from the background" and in which "undesired small movements are excluded". NISHIMURA et al. disclose a system using a TV camera, the system being provided with a contour-signal generator and a moving body extractor.

HASHIMOTO is directed to a movement pattern-recognizing apparatus having a sensor for detecting a mobile body and for providing binary movement signals indicating the position of the mobile body. The signal changes as time elapses, thus producing movement patterns being stored and compared for recognition by the apparatus. The system of HASHIMOTO uses a substantially fixed sensor providing data on a substantially narrow span. Moreover, the system of HASHIMOTO detects relatively large-scale displacements of a moving object or person.

KAMADA et al. is directed to an apparatus which recognizes a shape and movement of a moving body based on position data of feature points in an image of the moving body, taken by a TV camera. The moving body recognition apparatus includes a feature point position normalization unit for providing normalized coordinates of a feature point. Typically, two image-input units, such as a camera, are required to identify coordinates of each of the feature points using triangulation. Broadly described, KAMADA et al. aim at providing a moving body recognition apparatus capable of recognizing a rotating body by using a single image input unit.

Hence, in light of the aforementioned, there is a need for an improved system which, by virtue of its design and components, would be able to overcome some of the above-discussed prior art concerns.

SUMMARY OF THE INVENTION

Embodiments of the present invention advantageously provide a device which, by virtue of its design and components, satisfies some of the above-mentioned needs and is thus an improvement over other related tracking systems and/or methods known in the prior art.

According to a first aspect of the present invention, there is provided a method for real-time tracking of one or more object within a physical space. The method includes a step (a) of scanning a plane using a scanning beam, the plane intersecting the physical space, and of collecting reflection-distance data of the scanning beam as a function of position along the plane. The method further includes a step (b) of processing at least a portion of the reflection-distance data to locate discontinuities therein. The method then includes a step (c) of associating the discontinuities with one or more detected object within the physical space, and determining positioning data for each detected object based on positions of the corresponding discontinuities. The method then includes a step (e) of repeating steps (a) through (c) for a plurality of iterations.

Preferably, the method further includes, prior to step (e), a step (d) of, for each detected object, assigning an object-id, and generating an identified-object structure storing the object-id and object-tracking data based on the positioning data of the detected object, thereby defining at least one identified-object structure. Moreover, step (e) then preferably includes, after each iteration, performing, for each detected object, a step (i) of associating, if possible, a matching-object structure among the at least one identified-object structure, through a comparison of the positioning data of the detected object with the object-tracking data of each identified-object structure, and a step (ii) of updating, for each matching-object structure, the object-tracking data based on the positioning data of the corresponding detected object According to another embodiment of the present invention, there is provided a real-time tracking system for tracking one or more objects in real-time within a physical space along a plane intersecting thereacross.

The real-time tracking system includes a scanning sub-system for scanning the plane using a scanning beam, and for collecting reflection-distance data of the scanning beam as a function of position along the plane.

The system further includes a shape-analysis subsystem operatively connected to the scanning subsystem for receiving therefrom the reflection-distance data. The shape-analysis subsystem includes a discontinuity-detection module for processing at least a portion of the reflection-distance data to locate discontinuities therealong. The shape-analysis subsystem further includes an edge-detection module operatively connected to the discontinuity detection module for associating the discontinuities with one or more detected object within the physical space, and determining positioning data for each one of the detected object based on positions of the corresponding discontinuities.

Preferably, the edge detection module is further enabled to generate at least one identified-object structure, each identified-object structure storing an object-id and object-tracking data corresponding to one of the one or more detected object. The shape-analysis subsystem, thus preferably includes a tracking-and-identification module operatively connected to the edge detection module for associating, each detected object, if possible, to a matching-object structure among the at least one identified-object structure, through a comparison of the positioning data of the detected object with the object-tracking data of each identified-object structure, and for updating the object-tracking data of each matching-object structure based on the positioning data of the corresponding detected object.

According to another aspect of the present invention, there is provided an apparatus being provided with the above-mentioned real-time tracking system and/or components thereof.

According to another aspect of the present invention, there is provided a method for operating the above-mentioned real-time tracking system and/or apparatus.

According to another aspect of the present invention, there is provided a kit for assembling the above-mentioned real-time tracking system and/or apparatus.

According to yet another aspect of the present invention, there is also provided a method for assembling components of the above-mentioned kit.

According to yet another aspect of the present invention, there is also provided an establishment, structure and/or site being provided with one of the above.

The advantages and features of the present invention will become more apparent upon reading of the following non-restrictive description of preferred embodiments thereof, given for the purpose of exemplification only, with reference to the accompanying drawings.

BRIEF DESCRIPTION OF THE DRAWINGS

FIG. 13A is a block diagram of the real-time tracking system according to an embodiment of the present invention, the system comprising a shape-analysis module.

FIG. 13B is a block diagram of the shape-analysis module shown in FIG. 13A.

DETAILED DESCRIPTION

Figure 1:
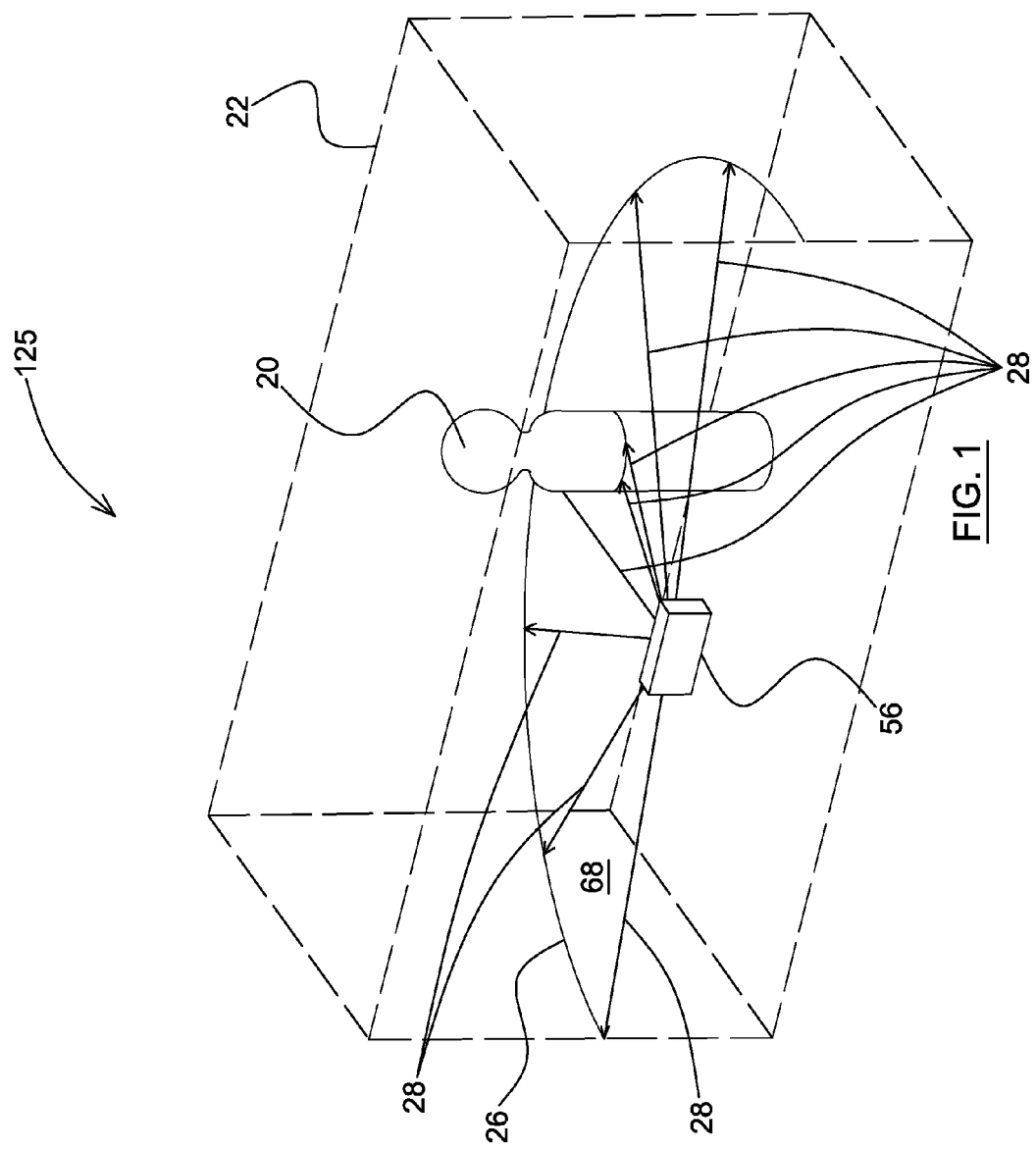
FIG. 1 is a schematic diagram of the real-time tracking system according to an embodiment of the present invention.

In the following description, the same numerical references refer to similar elements. The embodiments, configurations, steps and/or hardware shown in the figures or described in the present description are preferred embodiments only, given for exemplification purposes only.

Moreover, although the preferred embodiment of the tracking system and method of the present invention consists of certain configurations, steps and sequences of steps as explained and illustrated herein, not all of these components, steps and sequences thereof are essential to the invention and thus should not be taken in their restrictive sense, i.e. should not be taken as to limit the scope of the present invention. It is to be understood, as also apparent to a person skilled in the art, that other suitable components, cooperations thereinbetween, as well as other suitable sequences of steps may be used for the real-time tracking system and/or method according to the present invention, as will be briefly explained herein and as can be easily inferred herefrom, by a person skilled in the art, without departing from the scope of the invention.

Broadly described, the tracking system, according to the present invention, as exemplified in the accompanying drawings, provides a real-time tracking system and a method for identifying objects moving in a three-dimensional region, for example, one or more person on a concert stage or a scene of a show, and monitoring the course of each such object in real-time. The system or method is typically applied for producing one or more instantaneous physical effect, usually within the three-dimensional region, in response to the movement of each object.

The Method for Tracking Objects in Real-Time

According to an embodiment of the present invention, and as better illustrated in the accompanying drawings, namely with reference to FIGS. 1 to 4, there is provided a method for tracking one or more moving object in real-time within a physical space 22.

According to the method, a plane 26, which intersects the physical space 22 is scanned 24 by a scanning subsystem, in order to collect reflection-distance data 30 as a function of position along the plane 26. The reflection-distance data 30 is then processed 32 by a shape-analysis subsystem in order to locate among the reflection-distance data 30, a plurality of discontinuities 34, which are in turn associated 36 to one or more detected objects 38, typically for triggering an instantaneous physical effect to be produced, based on positions of the detected objects 38. The scanning 24 and processing 32 is repeated for a number of iterations, each iteration triggering a corresponding physical effect, in order to produce the physical effects in real-time. In other words, a real-time effect is produced in response to each scan.

Of course, the processing may include a number of manipulations in order produce a wide range of effects based on the objects being detected. Indeed and for example, a particular effect may be produced depending on the size of a detected object or even on the basis of a particular shape, profile or position, as can be easily understood. Moreover, the reflection-distance data and/or discontinuities may be filtered out based on certain conditions, prior to processing, as will be explained more in detail further below.

Preferably, still with reference to FIGS. 1 to 4, each detected object 38 is further identified and stored in the form of an identified-object structure, so as to identify each detected object 38 of a given scan, with respect to the previously scanned and identified objects, through matching with the identified-object structures on the basis of their respective positions, in order to follow or monitor the course of each particular object. Thus a particular physical effect may be produced based on the particular object having been identified, based on its direction or even speed. Moreover, such an object can still be tracked when it temporarily disappears with respect to the tracking system, as will be easily understood in view of the details provided further below.

The physical space 22 may be any area where the real-time tracking of an object is desired. Some embodiments of the invention may be of particular usefulness in entertainment platform such as a concert stage, a scene for a show, a playing field for a sport event, a television studio, a game space, an area of an amusement park etc., or any other suitable indoor or outdoor region.

Exemplary embodiments for each of the steps above will be given in more detail in the sections below.

Scanning

Figure 5:
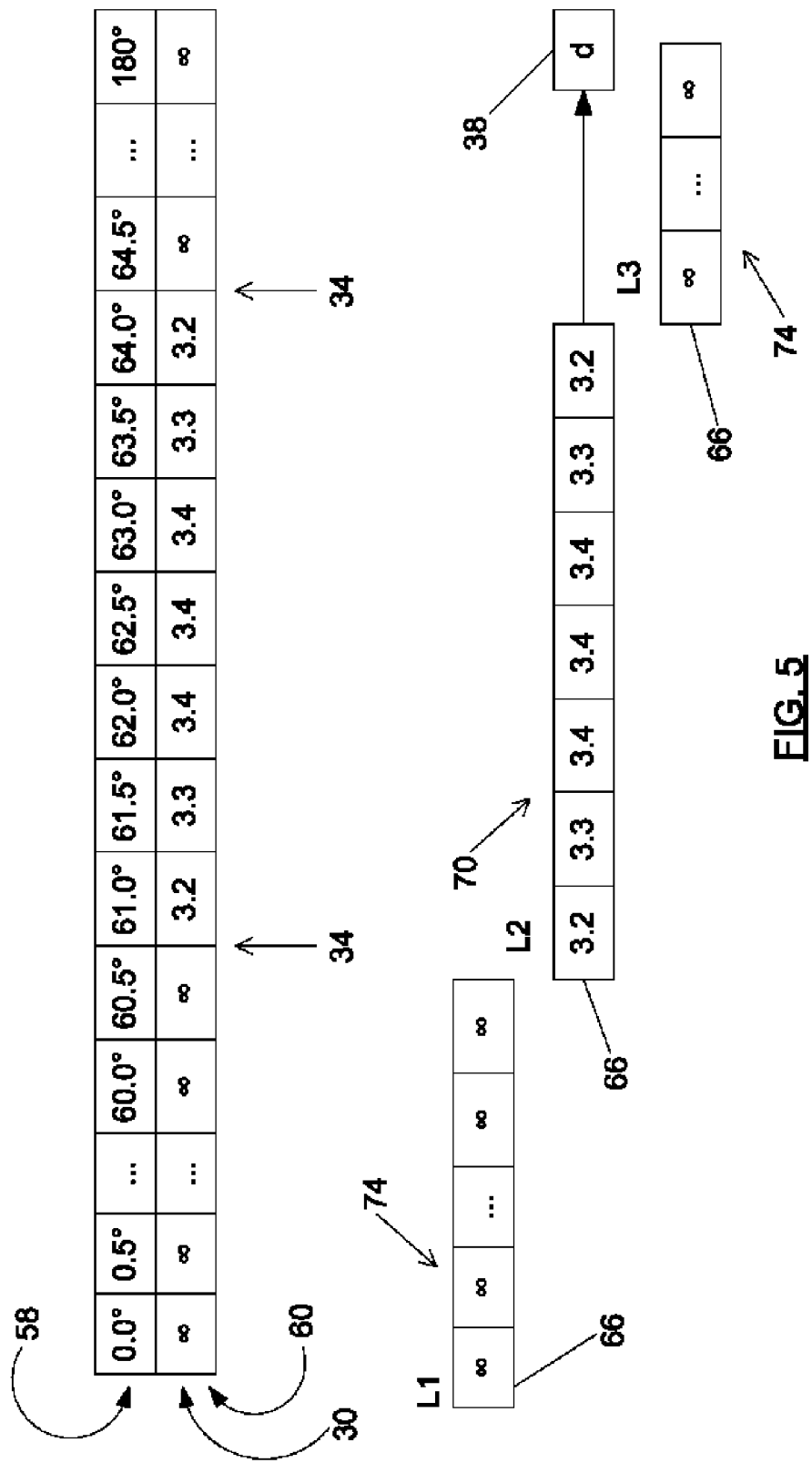
FIG. 5 is a schematic representation of the reflection-distance data being shown in an array of distance values and corresponding predetermined angles, according an embodiment of the present invention.

With particular reference to FIG. 1, according to a preferred embodiment of the present invention, step (a) includes projecting the scanning beam 28 from a scanning device 56 along the plane 26 at predetermined angles with respect to the scanning device 56. Preferably, the scanning device 56 is an infrared transceiver and the scanning beam 28 is an infrared light beam. Preferably, the plurality of angles are provided within a delimited range of angles. For example, the plurality of angles may be provided in half-degree)(0.5°) increments ranging from zero degree)(0°) to one-hundred-and-eighty degrees)(180°), as represented in FIG. 5, thus resulting in a semi-circular plane 26 being scanned. Of course, the range of angles may be wider or narrower, or even multiple, each range defining a section of a circle about the scanning device 56, as can be easily understood by a person skilled in the art. Moreover, the plurality of angles may be provided at any suitable increment and may further be provided at irregular increments, as long as the system is configured to process the corresponding reflection-distance data 30 accordingly.

Preferably, with further reference to FIG. 5, the reflection-distance data 30 includes distance values 60 calculated based on a time-of-flight of the scanning beam 28 being reflected against the one or more object, each distance value 60 corresponding to one of the predetermined angles 58. Preferably, and as exemplified in FIG. 5, the reflection-distance data 30 is provided in an array of values, each corresponding to one of the predetermined angles 58 of the scanned plane 26, for a given iteration. Preferably, the array stores distance results of the environment along the projected laser ray in a clockwise circular scan. Alternatively, the reflection-distance data 30 and/or distance values 60 may be transferred serially, via a USB connection, via TCP packet and/or any suitable data transfer means, such as for example, any wireless data transfer system. Preferably, the method, according to embodiments of the present invention, further includes, prior to step (b), converting 62 the reflection-distance data 30 for the processing of step (b).

Processing of Reflection-Distance Data to Identify Discontinuities

Preferably, the array of distance data 60 is then processed at step (b). More particularly, still with reference to FIG. 5, the processing of step (b) includes: sequentially reading the distance-values 60, the distance-values 60 being sorted based on an ascending order of the corresponding predetermined angles 58. The processing of step (b) further includes, while sequentially reading: identifying the discontinuities 34 where two successive distance-values 60 being read differ by greater than a maximum-gap value 64; and generating, at a first one of the distance values and at each one of the discontinuities 34, a list 66 and storing therein each distance-value being read. Thus, the associating of step (c) includes associating each generated list 66 to one of the one or more detected object 38. In other words, each of the distance values 60 of the reflection-distance data 30 corresponds to a point in space and each of the distance values of the array is read sequentially and stored into a list 66. A new list 66 is generated when the gap between the two distance values 60 is greater than the above-mentioned maximum-gap value 64, in other words, when a point in the distance values is substantially different to the previous point, so as to generate a new list 66 at each detected discontinuity 34, each list 66 containing the following distance values 60 therein, up to the next discontinuity 34. For each given angle, the scanning beam being projected may be reflected to produce a distance value or may alternatively not be reflected, such that a default value is returned for that predetermined angle, as symbolized by the infinity character in FIG. 5. The lists 66 corresponding to segments where the scanning beam 28 was not reflected may be filtered such that only lists 66 containing defined distance values are associated to an object. Alternatively, the filtering of segments where no objects are detected may also be processed or filtered at another step of the method, as can be easily understood by a person skilled of the art. Of course, the reflection-distance data 30 may be processed in a number of different ways without departing from the scope of the present invention, as can be easily understood. Indeed and for example, the reflection-distance data 30 may be converted into positions, for example in the form of Cartesian coordinates, circular coordinates and/or the like, such that the discontinuities 34 are identified based on the positions of each point. Each detected object 38 is thus delimited, typically by a pair of discontinuities 34, or by one discontinuity 34 and a border of the physical space 22, a detection zone, etc.

Figure 6:
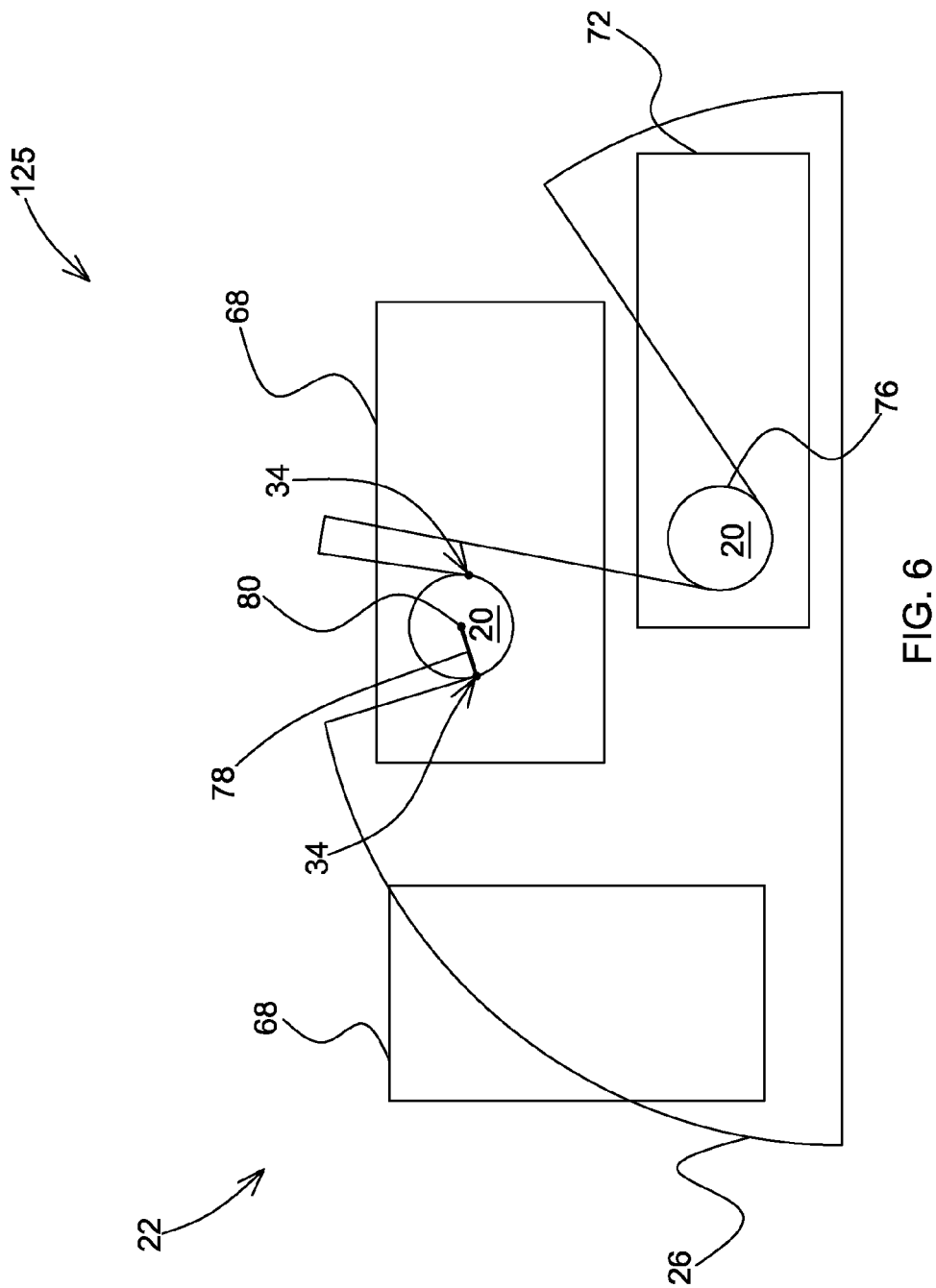
FIG. 6 is a schematic representation of the real-time tracking system according to another embodiment of the present invention, the real-time tracking system being shown with a plane 26 delimiting detection and exclusion zones.

The plane 26 may include one or more detection or exclusion zones 68, 72, as shown in FIG. 6. A detection zone 68 corresponds to a region along the plane 26 and typically within the physical space 22 where detected objects 38 are to be processed. An exclusion zone 72 corresponds to similar areas along the plane 26 wherein objects 20 are not to be processed. In other words, such detection zones 68 are preferably provided in order to select objects 20 located therein for tracking Moreover, exclusion zones 72 are provided for excluding the tracking of objects located therein. In other words, a shape filtering occurs, that is to say, only shape portions that are inside detection zones 68 are considered and shape portions that are inside exclusion zone 72 are ignored. Thus, the plane 26 may include at least one detection zone 68 within the physical space 22. Accordingly, with further reference to FIG. 3, the method preferably includes, at step (b) 32, identifying selected-distance data 70 among the reflection-distance data, corresponding to the at least one detection zone 68, and processing only this selected-distance data 70. The plane 26 may also include at least one exclusion zone 72 within the physical space 22. Accordingly, with further reference to FIG. 3, the method preferably includes, at step (b) 32, identifying excludible-distance data 74 in the reflection-distance data 30, corresponding to each of the at least one exclusion zone 72, and filtering out the excludible-distance data 74 from the reflection-distance data. As a result, an object or a portion thereof being located in a selection zone is detected and an object or a portion thereof being located in an exclusion zone 72 is ignored, as better illustrated in FIG. 6.

The identification of such selected-distance data and excludable-distance data is based on a comparison of the position of the distance data with respect to the area corresponding to the detection zone or exclusion zone, respectively. Such a comparison may be based on a Cartesian or circular coordinates system, namely to verify, for each item of the reflection-distance data if the corresponding position is located in one of these detection or exclusion zones. A detection or exclusion zone 68, 72 is generally delimited by a rectangular shape as also depicted in FIG. 6, however, each detection zone or exclusion zone may have any other suitable shape and/or dimension, as can be easily understood by a person skilled in the art. For example, a detection zone 68 may correspond to a stage area, an ice rink, a playing field of a sports event, a wall of a room or building, etc. and an exclusion zone 72 may correspond to any area outside of the prior mentioned sites. Moreover, a detection zone 68 may include the entire semi-circular section of the plane intersecting the physical space and the exclusion zone 72 may include any position outside of this semi-circular section. Moreover, one or more exclusion zones 72 may be provided totally or partially within a detection zone 68, as can be easily understood by a person skilled in the art. Thus, the method would preferably provide a suitable configuration in order to identify the corresponding selected distance data and filter out therefrom the corresponding excludable distance data. Alternatively, the identifying and processing, that is, selecting or excluding, may be completed at another step of the method described herein, as can be easily understood by a person skilled in the art. Also as easily understood, the above-mentioned excludable distance data may correspond to distance values representing infinity, that is to say, distance values corresponding to a scanning beam not having been reflected. As a result, each detected object may be associated to a pair of discontinuities, provided they are both included in a detection zone, or by one discontinuity and a border of the physical space or of a detection and/or exclusion zone.

Object Identification

Figure 3:
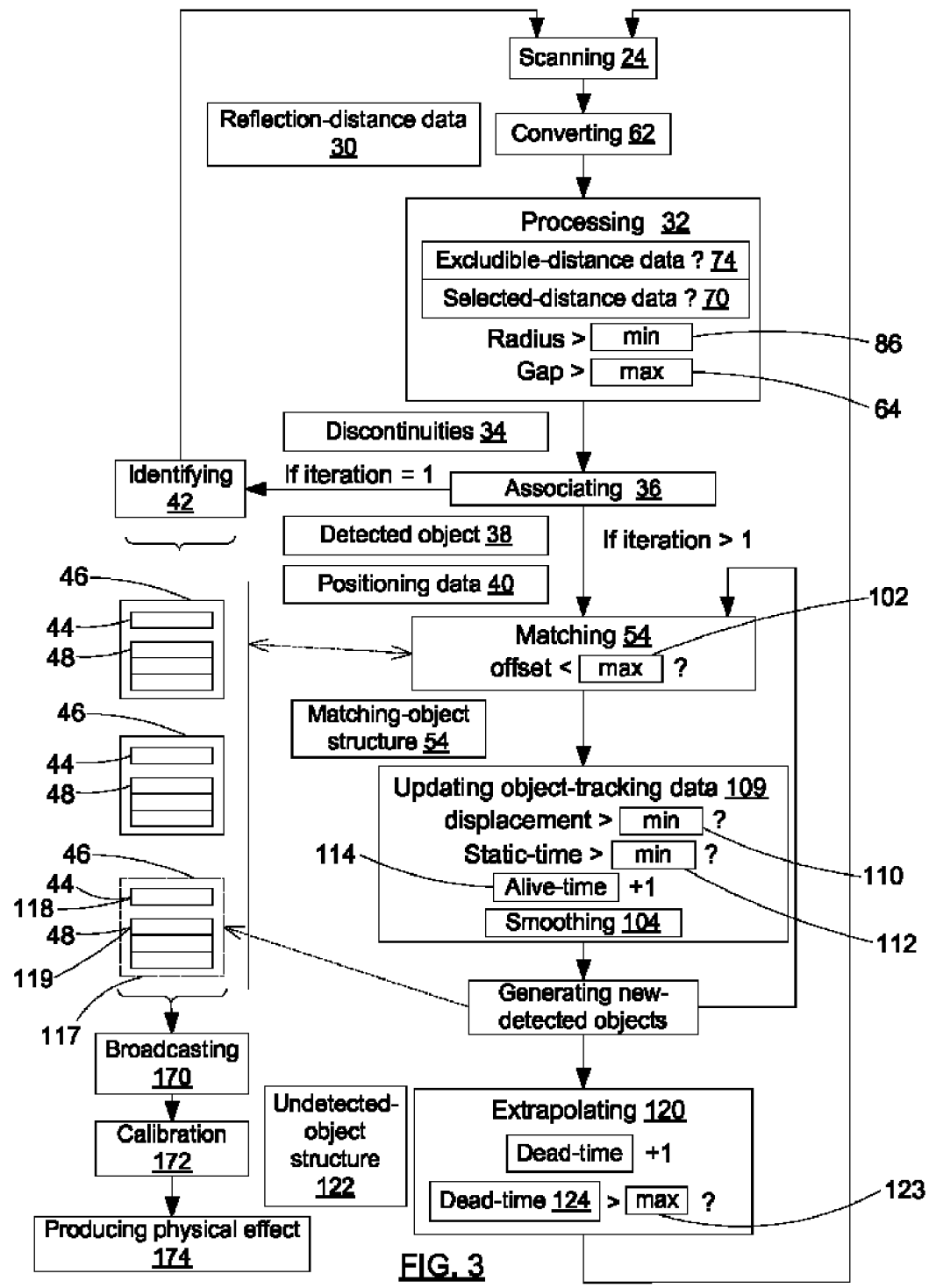
FIG. 3 is a block diagram showing the method for real-time tracking according to an embodiment of the present invention.
Figure 4:
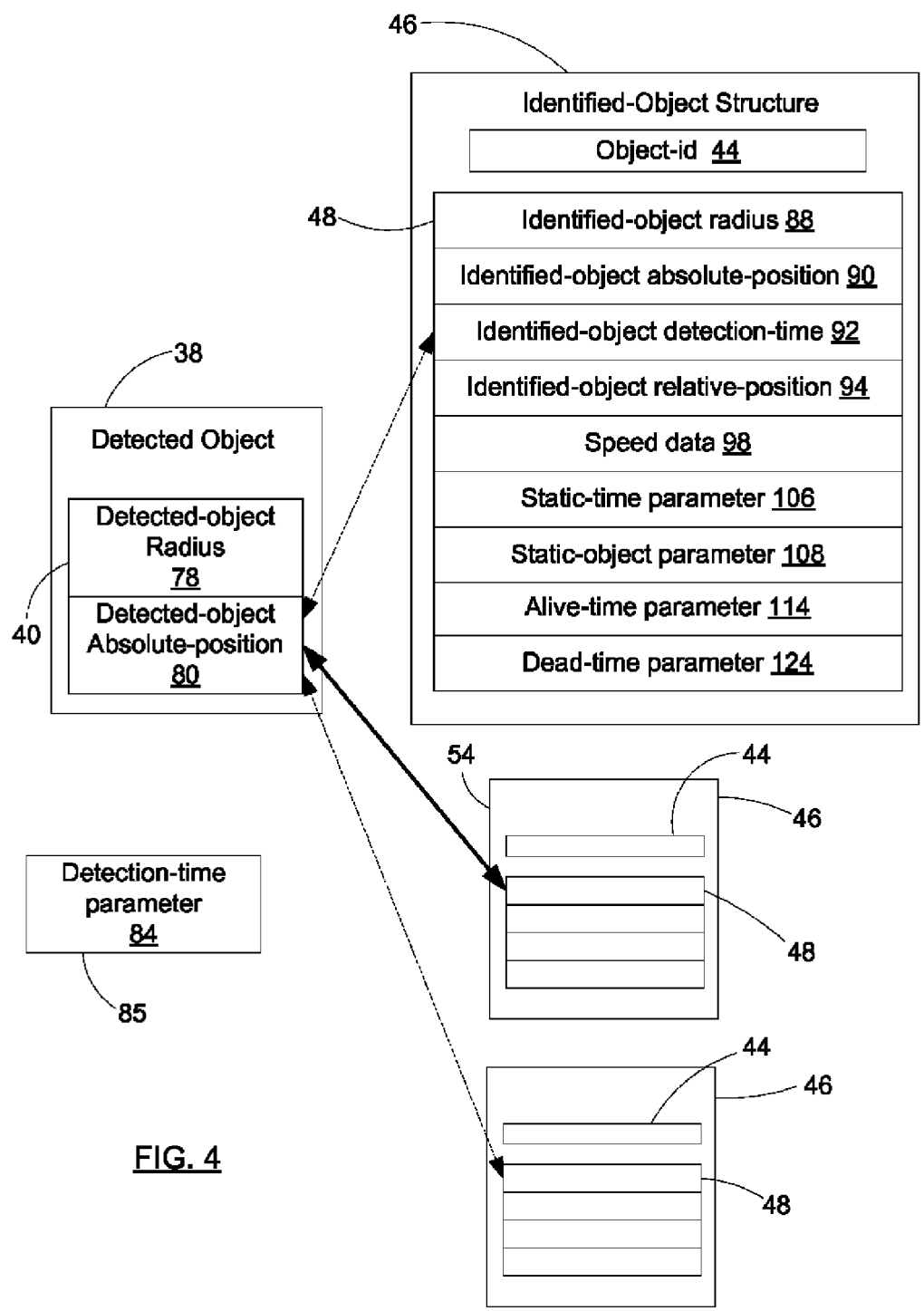
FIG. 4 is a schematic representation of a detected object being shown in comparison with a plurality of identified-object structures for comparison.

Preferably, referring now to FIGS. 4 and 6, the positioning data 40 of each detected data includes parameters such as a detected-object radius 78 and a detected-object absolute-position 80 in order to provide positioning information with respect to each object 20 having been detected. The detected-object absolute-position 80 corresponds to the midpoint between the pair of corresponding discontinuities 34, corresponding substantially to the centroid of the detected object 38. The detected-object radius 78 typically corresponds to the distance between the detected-object absolute-position 80 and the position of one of the corresponding pair of discontinuities 34. Moreover, a detection-time parameter 84 corresponding to the time of detection is preferably stored in memory in order to record the time of detection corresponding to the detected object 38. Preferably, the detected-object radius 78 is preferably used to verify whether the corresponding detected object 38 should be filtered out, namely if the detected object 38 is too small, preferably by determining whether the detected-object radius 78 is inferior to a minimal-radius threshold 86 (FIG. 3). Other parameters and/or information based on the positioning data 40 of the detected object 38 may be used to validate whether an object is too small to be processed, as can be easily understood, such as, for example, the diameter, etc. Moreover, a number of additional parameters may be provided to identify particular characteristics of an object, in order to produce a corresponding effect, for example, based on the particular profile of the object. Indeed, the reflection-distance data provides information with respect to the contour of the object having been detected.

Figure 7:
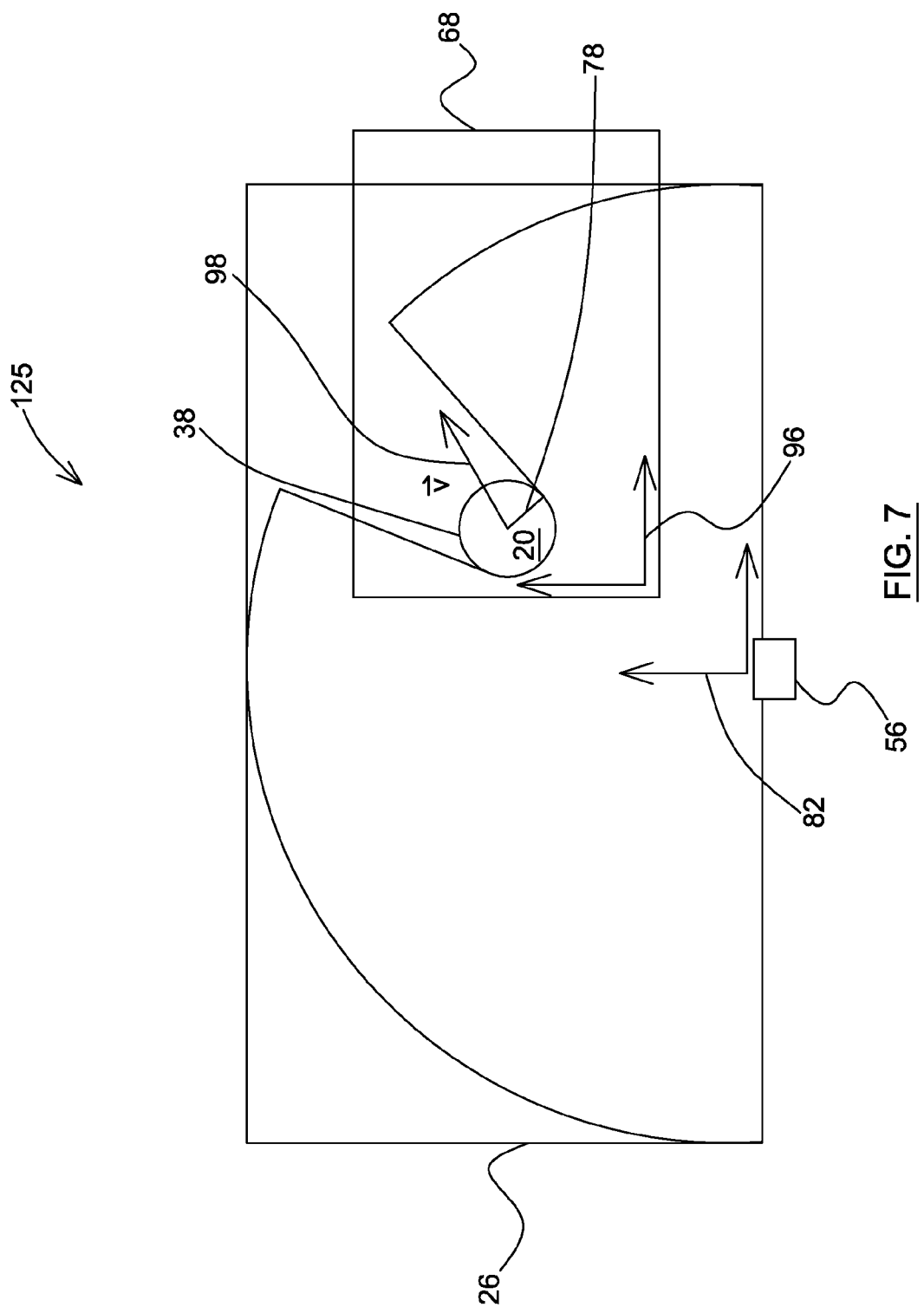
FIG. 7 is a schematic representation of the real-time tracking system according to another embodiment of the present invention, the system being shown with a common reference and a relative reference.

According to a preferred embodiment of the present invention, referring now to FIGS. 4 and 7, the method includes additional steps at step (c), namely, for each detected object 38, evaluating the detected-object radius 78 based on positions of the corresponding discontinuities 34, evaluating the detected-object absolute-position 80 corresponding to the centroid of the detected object 38 relative to a common reference 82, and storing in memory 85 a detection-time parameter 84, corresponding to a time of detection associated to the one or more detected object 38 for one iteration. The above-mentioned common reference 82 may be provided by any positioning system (Cartesian coordinates, circular coordinates, etc.) to provide global positioning of the objects to be detected. Indeed and for example, such a positioning system may be provided by a Cartesian coordinate system originating at the scanning device 56, as illustrated in FIG. 7 of the drawings. Moreover, with reference to FIG. 3, step (c) 32 preferably includes filtering out each detected object 38 having a detected-object radius 78 inferior to a minimal-radius-threshold 86. Alternatively or additionally, the size of the detected object 38 may be processed based on a diameter, corresponding substantially to the distance between the two corresponding discontinuities 34 and/or the like, as can be easily understood.

Accordingly, referring still to FIG. 4, each identified-object structure 46 is preferably generated with parameters in the object-tracking data 48 corresponding to the above-mentioned parameters associated with the detected object 38. Namely, each identified-object structure 46 includes an identified-object radius corresponding to the detected-object radius 78 of the corresponding detected object 38, an identified-object absolute-position 90 corresponding to the detected-object absolute-position 80 of the associated detected object 38 and an identified-object detection-time 92 corresponding to the detection-time parameter 84 stored in memory 85. Moreover, the object-tracking data 48 may include an identified-object relative-position 94 corresponding to the detected-object absolute-position 80 of the associated detected object 38, with respect to a relative reference 96, as illustrated in FIG. 7. Such a relative reference 96 may be based, for example, on a detection zone 68 or exclusion zone 72, as exemplified in FIG. 7. Alternatively, the relative reference 96 may be based on any suitable positioning system located at any suitable position with respect to the plane 26 being scanned. The object-tracking data 48 may include both identified-object absolute-position 90 and identified-object relative-position 94, as can be easily understood according to a person skilled in the art. Moreover, if a same object is detected in two overlapping detections zones, two corresponding identified-object structures may be generated, each storing a relative-position value with respect to one detection zone. Alternatively, the object-tracking data 48 may include a plurality of identified-object relative-position 94, each corresponding to one relative reference 96. Indeed and for example, one identified-object structure 46 may be provided with an absolute position, a relative position with respect to a selection zone, as well as another relative position with respect to an exclusion zone 72. Alternatively, any number of identified-object relative-position 94 may be provided. Moreover, the identified-object relative-position 94 may be provided with respect to any positioning system, that is, not necessarily associated with a detection or exclusion zone 68, 72. Moreover, the object-tracking data 48 preferably, further includes speed data 98, as also shown in FIG. 4. The speed data 98, which typically includes a speed and a direction, is based on a displacement of the detected object 38 by comparing a current position with respect to a previous position, as a function of the time elapsed since the last iteration of scanning Thus, the speed data 98 may be updated at step (e), based on a calculation of a displacement 100 as a function of a duration, the displacement corresponding to a variation of the identified-object absolute-position 90 before and after update thereof, and the duration corresponding to a variation of identified-object detection-time 92 before and after update thereof, when referring to FIGS. 2 and 4. Thus, one or more identified-object structures 46 are created, each corresponding to an object in the physical space 22, having been detected.

Object Matching

Figure 2:
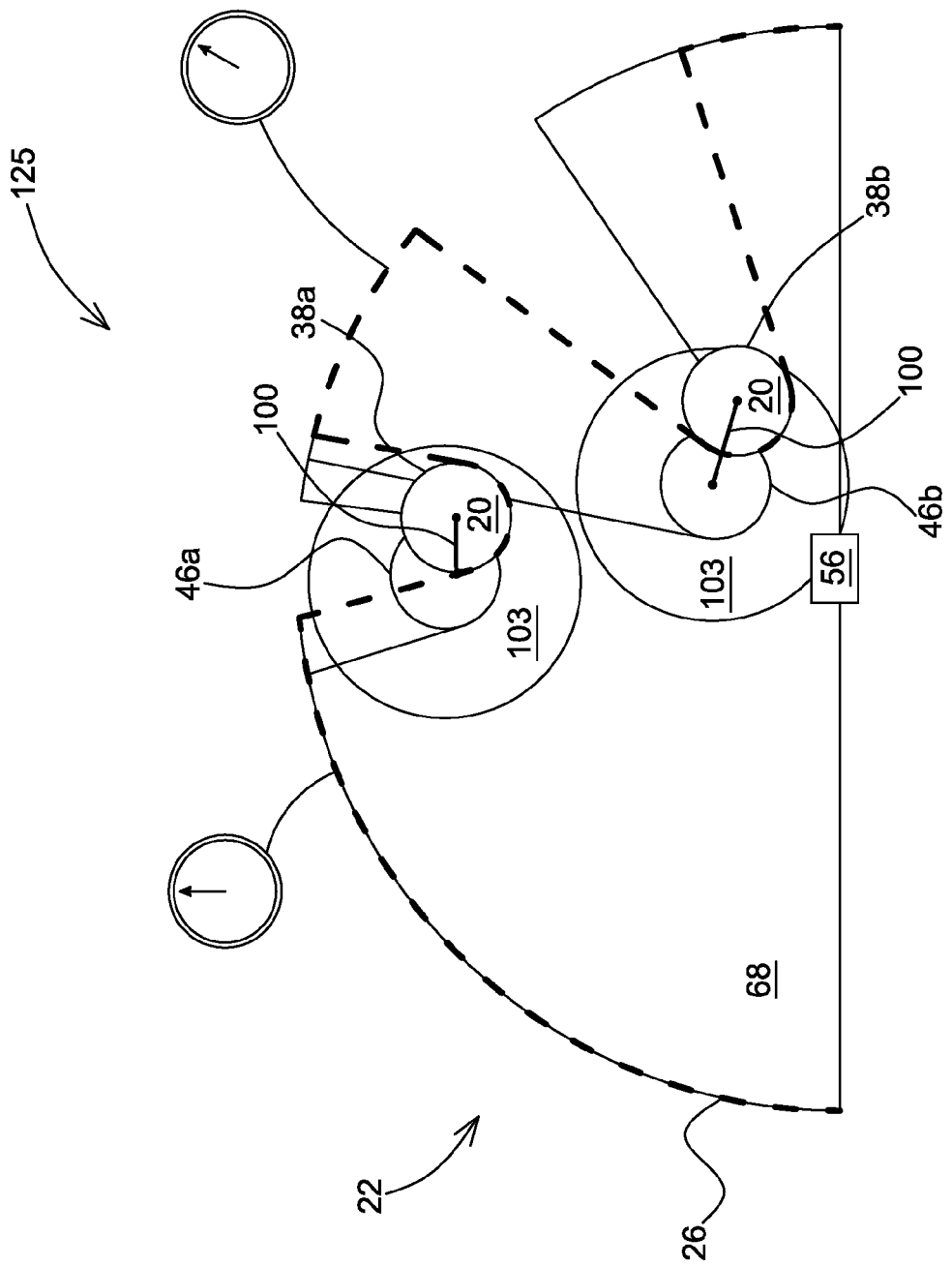
FIG. 2 is a schematic representation of the real-time tracking system according to another embodiment of the present invention.

Referring back to FIG. 3, the scanning 24 of the plane 26, locating of discontinuities 34, and detected-objects (steps (a) to (c)) are repeated as part of a new scan (iteration). The objects detected in this new scan must now be matched with the identified-object structures 46 generated at the previous scan (step (d) of first iteration). Accordingly, the method is provided with the above-mentioned step of associating 54 the detected-object with one of the identified-object structure 46, thereby identifying a matching-object structure 54. This matching process 54 is preferably done based on the current position of the detected-object in comparison with the position of the same object at the previous scan, as illustrated in FIG. 2, by comparing the detected-object absolute-position 80 of the detected object 38 with the identified-object absolute-position 90 of each identified-object structure 46 in order to find the closest identified-object structure 46 (detected-object of previous scan), thereby identifying a matching-object structure 54. A first detected-object 38*a* is matched with an identified-object structure 46*a* corresponding to the same detected-object having been previously identified and a second detected-object 38*b* is matched with a corresponding identified-object structure 46*b* having been identified at the previous scan. In other words, knowing the location and id of objects in the preceding scan, a match is attempted for each detected object 38 within the newer scan, such that each identifier (object-id 44) "sticks" to the corresponding moving object 20.

Thus, the associating of step (i) (matching step) includes, for each detected object 38, a first step of evaluating each offset 100 between the identified-object absolute-position 90 of each identified-object structure 46 and the detected-object absolute-position 80 of the detected object 38 in order to identify a smallest offset 100, and a second step of associating the detected object 38 with the matching-object structure 54 corresponding to the identified-object structure 46 associated with the smallest offset 100. Preferably, this smallest offset 100 is inferior to a maximal-match-distance 102, thus defining a circular search zone 103 about each identified object, as shown in FIG. 2. This circular search zone may be provided either about the detected-object or about the identified-object structure 46, as can be easily understood according to a person skilled in the art.

Preferably, the positions are smoothed by a configurable low-pass filter, so that the high frequency noise is filtered. Thus, updating 55 at step (ii) of the method further includes, smoothing 104 the object-tracking data 48 by low-pass filter based on the previously stored object-tracking data 48.

Preferably, once all objects are tracked and identified, their life and movement is evaluated so that static objects are processed as part of a static background. Static objects can be sent or not over the network depending on how the module is configured. Thus, the object-tracking data 48 of each identified-object structure 46 preferably includes a static-time parameter 106 and a static-object parameter 108, as illustrated in FIG. 4, for identifying objects which have not moved or are substantially immobile, typically for identifying elements of background or decor, and avoiding to produce a physical effect with respect to such static objects. The method thus preferably includes at step (e), evaluating, for each identified-object structure 46, a variation of the corresponding identified-object absolute-position 90 before and after update thereof, and, if the variation is lesser than a minimal-displacement value 110, incrementing the static-time parameter 106. Preferably, if the corresponding static-time parameter 106 exceeds a minimal-static-time value 112, the static-object parameter 108 of the corresponding identified-object structure 46 is identified as being positive. More particularly, if the object is found to be static the static-object parameter 108 is assigned a value of one (1) and, otherwise, the static-object parameter 108 is assigned a value of zero (0).

Preferably, the object-tracking data 48 of each identified-object structure 46 includes an alive-time parameter 114, as illustrated in FIG. 4. The method thus preferably includes, when referring to FIG. 3, incrementing at step ii 109, the alive-time parameter 114 of each matching-object structure 54.

After a first iteration of the scanning, locating of discontinuities and detecting of objects in the physical space, it is possible in the subsequent iterations that a new object enters the physical space. Thus, such an object may be detected at a subsequent iteration but would not be matched to an identified-object structure, since it has just newly appeared in the space. In order to process such a new detected-object, a new identified-object structure is preferably generated, in order to store a new corresponding unique object-id with corresponding object-tracking data. The method thus preferably includes, when referring back to FIG. 3, at step (e), identifying at least one new-detected object 116, each corresponding to one among the one or more detected object 38, not having been associated at step i, and generating, for each new-detected object 116, a new identified-object structure 117 storing corresponding new object id 118 and new object-tracking data 119 based on the positioning data 40 of the new-detected object 116.

Figure 9:
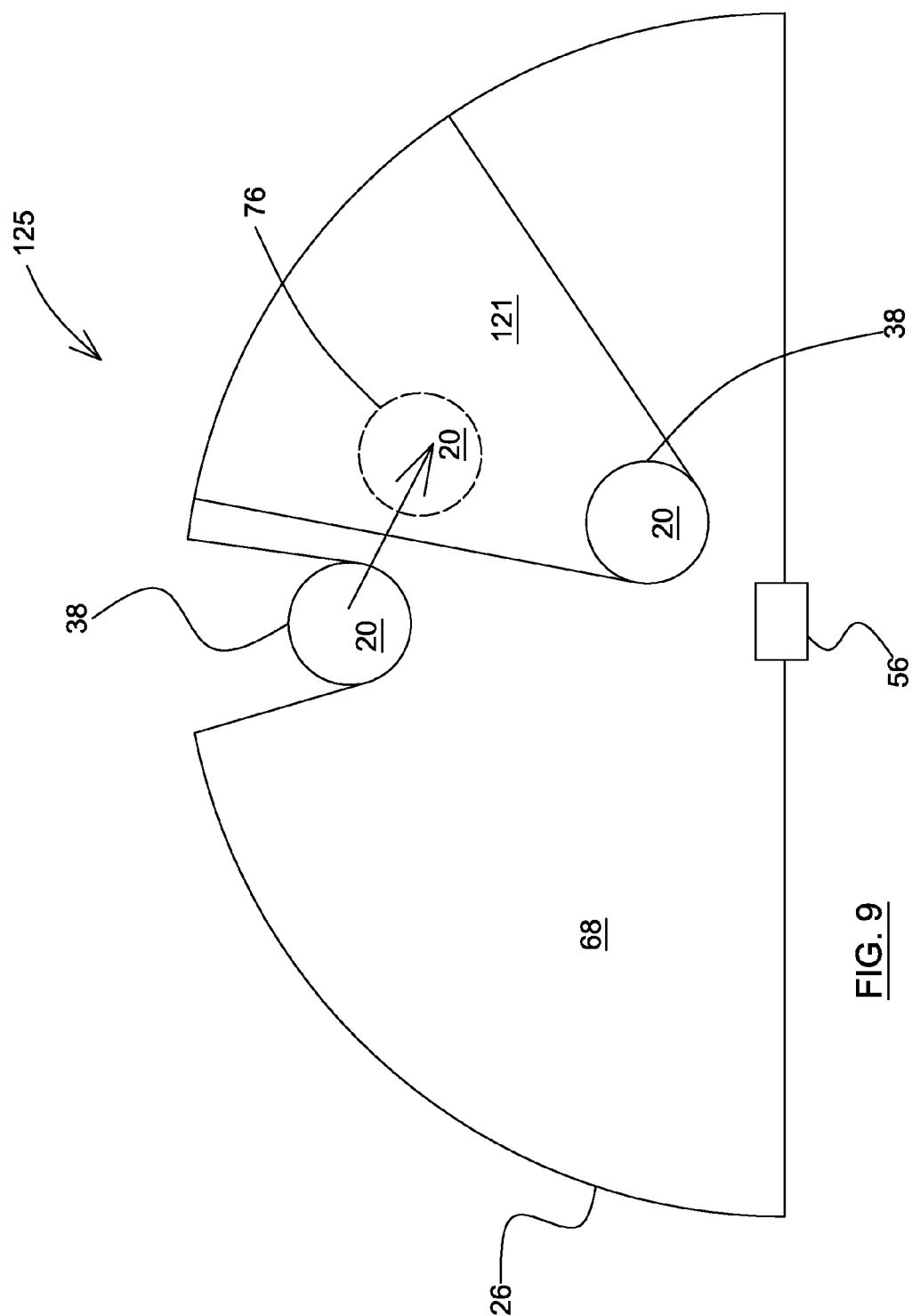
FIG. 9 is a schematic representation of the real-time tracking system according to another embodiment of the present invention, the system being shown with an object moving towards a blind spot defined by another object.

Similarly, with reference to FIG. 9, it is possible that some objects which have been previously detected and identified, that is to say, at a previous iteration of a scan, are not detected at a current scan. That may occur where an object 20 leaves the scanned plane 26 (either under or over), or in circumstances where an object leaves a detection zone 68 or enters an exclusion zone 72, as well as when an object is hidden by another object, and thus entering a blind zone 121 created by a foremost object, as illustrated in FIG. 9. Preferably, the method allows tracking of such disappearing objects 76, also referred to herein as "undetected objects." The tracking of such an object is provided by extrapolating data, namely position information based on the stored object-tracking data 48 of the corresponding identified-object structure 46 before it disappeared. With further reference to FIG. 3, for each identified-object structure 46 not having been associated to a detected object 38, thereby defining an undetected-object structure 122, the corresponding object-tracking data 48 is updated by extrapolation 120 based on the currently-stored object-tracking data 48. More particularly, the position, that is, the absolute-position and/or relative-position, are updated on the basis of the previous position and speed data 98 stored in the object-tracking data 48. Thus the updated object-tracking data 48 reflects the assumed current position of the undetected-object structure 122. Indeed, the speed data 98 corresponding to a speed and a direction, it is possible to extrapolate a probable position of the undetected-object, such that when it reappears (when it is detected again), the object is correctly identified and thus coherently tracked. Accordingly, the method preferably further includes, at step (e), steps of identifying at least one undetected-object structure 122, each corresponding to one among the at least one identified-object structure 46, not having been associated at step (i) 54, and for each undetected-object structure 122, updating the corresponding object-tracking data 48 by extrapolation 120 based on the stored object-tracking data 48.

Moreover, the object-tracking data 48, preferably includes a dead-time parameter 124, which is preferably incremented or updated at each iteration wherein the corresponding object goes undetected. When the dead-time parameter 124, exceeds a maximum dead-time value 123, the corresponding identified-object structure 46 is deleted. Accordingly, the method preferably further comprising at step (e), for each undetected-object structure 122, incrementing the corresponding dead-time parameter 124; and if the dead-time parameter 124 exceeds a maximum dead-time value 123, deleting the undetected-object structure 122.

Scanning Multiple Planes

Figure 10:
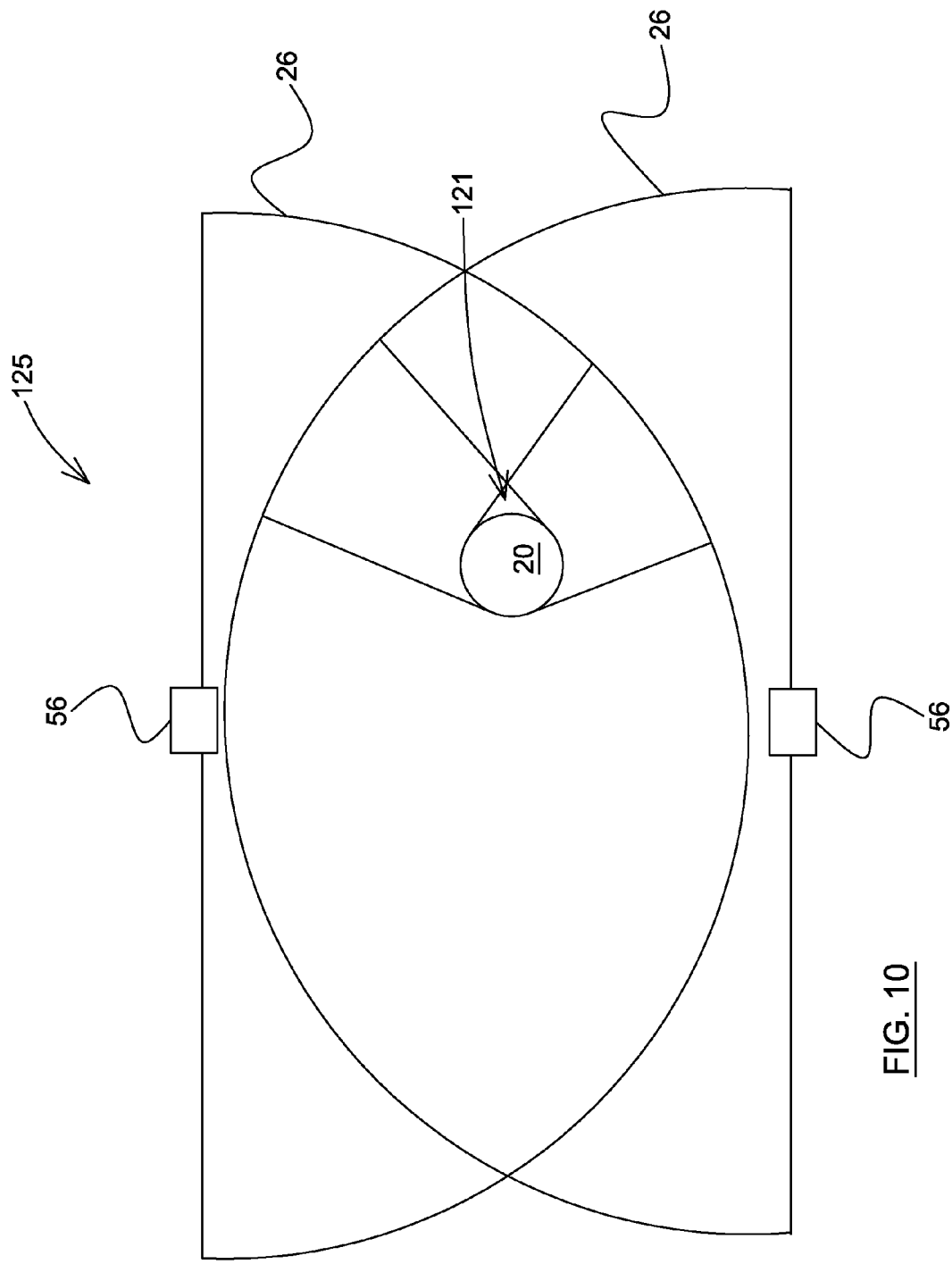
FIG. 10 is a schematic representation of the real-time tracking system according to another embodiment of the present invention, the system being shown with two scanning devices scanning two overlapping planes.
Figure 11:
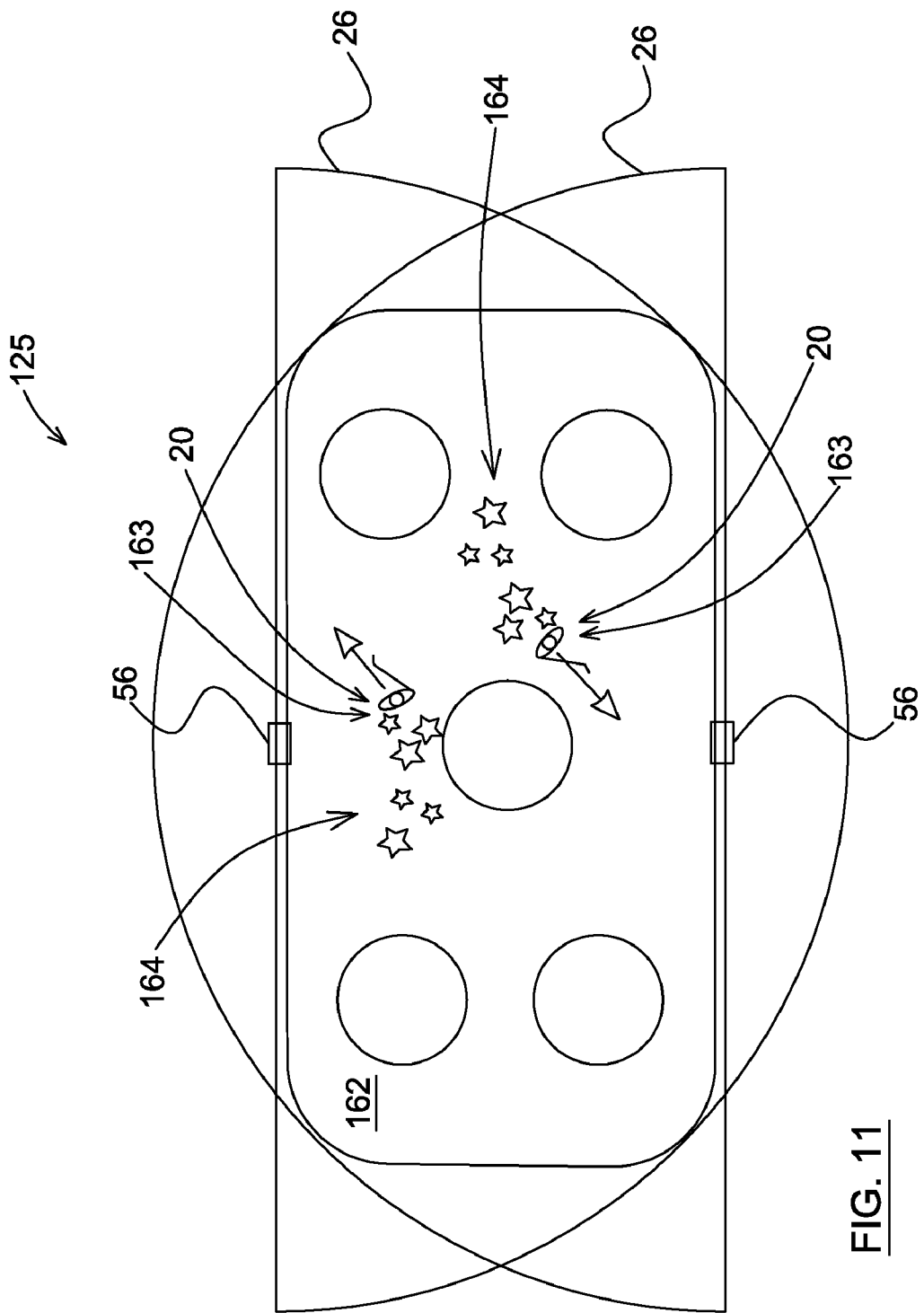
FIG. 11 is a schematic representation of the real-time tracking system according to another embodiment of the present invention, the system being shown with two scanning devices scanning the surface of an ice rink.
Figure 12:
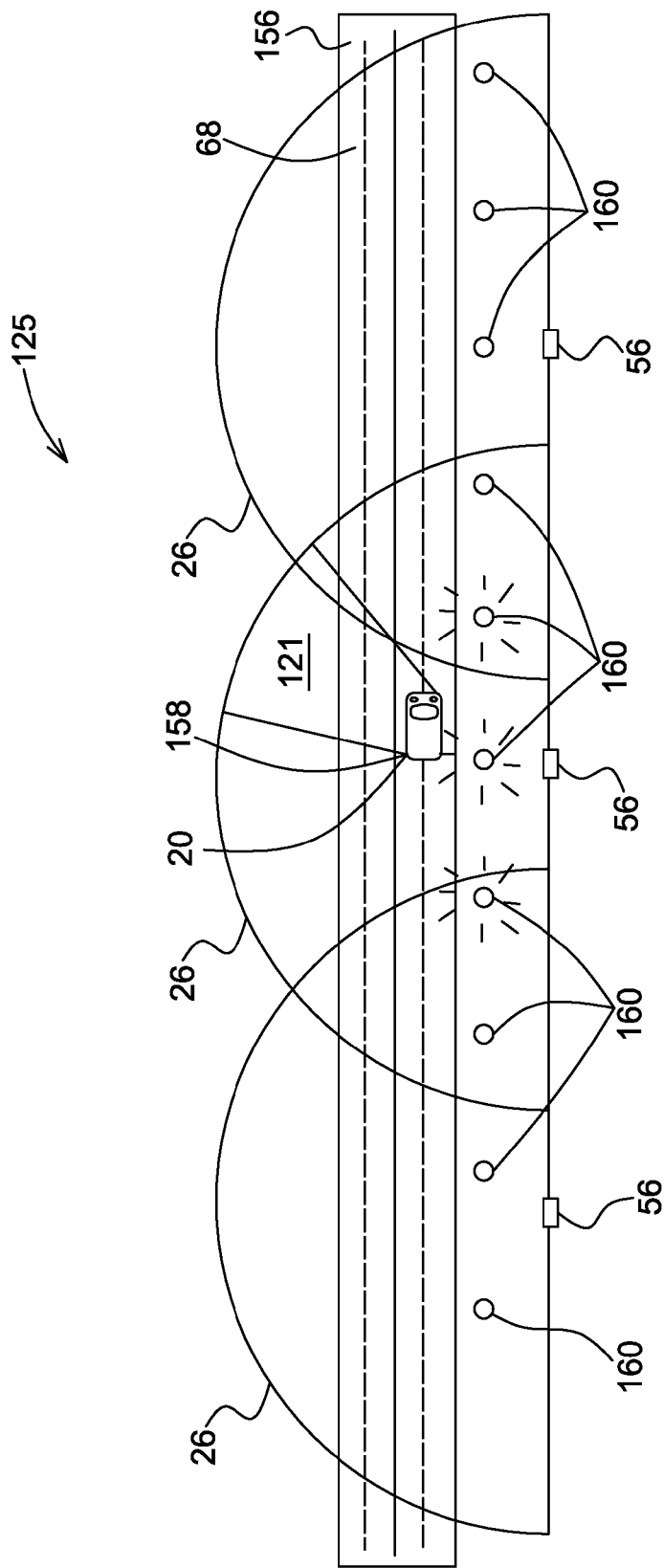
FIG. 12 is a schematic representation of the real-time tracking system according to another embodiment of the present invention, the system being shown with a plurality of scanning devices, each scanning substantially adjacent planes of a physical space.

Referring now to FIGS. 10 to 12, according to other embodiments of the present invention, the system and method described herein is adapted to merge and process multiple sets of reflection-distance data corresponding to a plurality of planes 26. Thus, instead of comparing two consecutives scans from a single scanner, the scans coming from the two (2) or more scanners are compared. As such, each plane 26 may be scanned by a distinct scanning device 56 located and configured suitably with respect to the plane 26, each scanning device 56 producing a distinct set of reflection-distance data. Alternatively, a same device may be moved and/or rotated in order to sequentially capture sets of reflection-distance data from a plurality of locations. Preferably, each set of reflection-distance data is processed separately, at a given iteration of the above-described method. Thus, the associating or matching of step (i), would allow the matching of objects identified by each of the scans (i.e. along each plane 26) by comparison of their positions, preferably with respect to a global reference (i.e. detected-object absolute-position 80 and identified-object absolute-position 90). Within the plurality of planes 26 being scanned, at least two of the planes 26 may be overlapping, substantially adjacent, substantially parallel with respect to one another and/or intersecting. Alternatively, the planes 26 being scanned may be entirely disassociated from one another. A configuration of opposing scanning devices 56 wherein the scanned planes 26 are overlapping, as exemplified in FIGS. 10 and 11, provides better coverage and reduction of blind spots resulting from the presence of objects, thus providing a more robust method and system, as well as better performance, since the necessity for extrapolating information is also reduced and in some cases, eliminated. Moreover, the facing scanners configuration provides means for obtaining and processing complete contour data of objects being detected, that is to say, positions along the full periphery of an object. Additional scanning devices 56 may be provided to further increase coverage and accuracy of data. Alternatively, a pair of scanning devices 56 may be provided in a back-to-back configuration, such that the planes 26 being scanned form a substantially circular region about the scanning devices 56, thereby covering 360 degrees. The same effect could be produced by a single scanning device 56 being rotated, as can be easily understood. Thus, the plurality of planes 26 is preferably scanned (step (a)) sequentially and/or simultaneously, and each resulting set of reflection-distance data is preferably processed (steps (b) to (e)) sequentially. Accordingly, repeating of step (e) in the method preferably includes repeating for a plurality of the planes 26, each of the planes 26 corresponding to one of the iterations. It is to be understood, as previously explained, that for some of the steps, such as, the step (a) of scanning two or more iterations may occur simultaneously. Moreover, steps (b) and/or (c) may also be completed simultaneously for a plurality of planes 26, as can be easily understood by a person skilled in the art, depending on the particular configuration of the system. Preferably, repeating of step (e) of the method further includes repeating for a recurring sequence of the plurality of planes 26. Also preferably, the method further includes for each of the iterations, projecting the scanning beam 28, along one of the planes 26, from a distinct corresponding scanning device 56.

Moreover, with reference to FIG. 3, the method preferably further includes a step of broadcasting 170 at least a portion of the object-tracking data 48 of the at least one identified-object structure 46 via a network. The method preferably further includes a step of calibration 172, that is to say, outputting at least one command for producing an effect based on the object-tracking data 48 of the at least one identified-object structure 46 or on the positioning data 40 of the detected object 38. Moreover, the method preferably further includes a step of producing 174 a physical/visual effect in response to the at least one command. More particularly, effects may be similar for each object in the space or alternatively, different effects may be produced based on particular parameters of corresponding identified-object structures or positioning data of detected objects.

Examples of Applications

For example, with reference to FIG. 12, a system may be provided for interactively lighting street lamps as a car 158 passes near the lamps 160, the detection zone 68 corresponding to the road 156, and system detecting and tracking the car 158 as an object 20. Accordingly, signals are sent to the corresponding lamps 160 to control the intensity of each lamp in response to the moving car.

Also exemplified, with reference to FIG. 11, is an interactive hockey rink 162, wherein hockey players 163 are surrounded by stars 164 projected around each player. Data coming from two (2) scanners 56 facing each other is merged. A shape analysis identifies each player 163 on the rink 162 as an object 20 and screen calibration instructs projectors to project star-shaped lights around each player 163. Particles systems are preferably projected around each player and the sets of stars 164 of each player may appear with a distinct configuration, color arrangement, overall look, etc.

Figure 8:
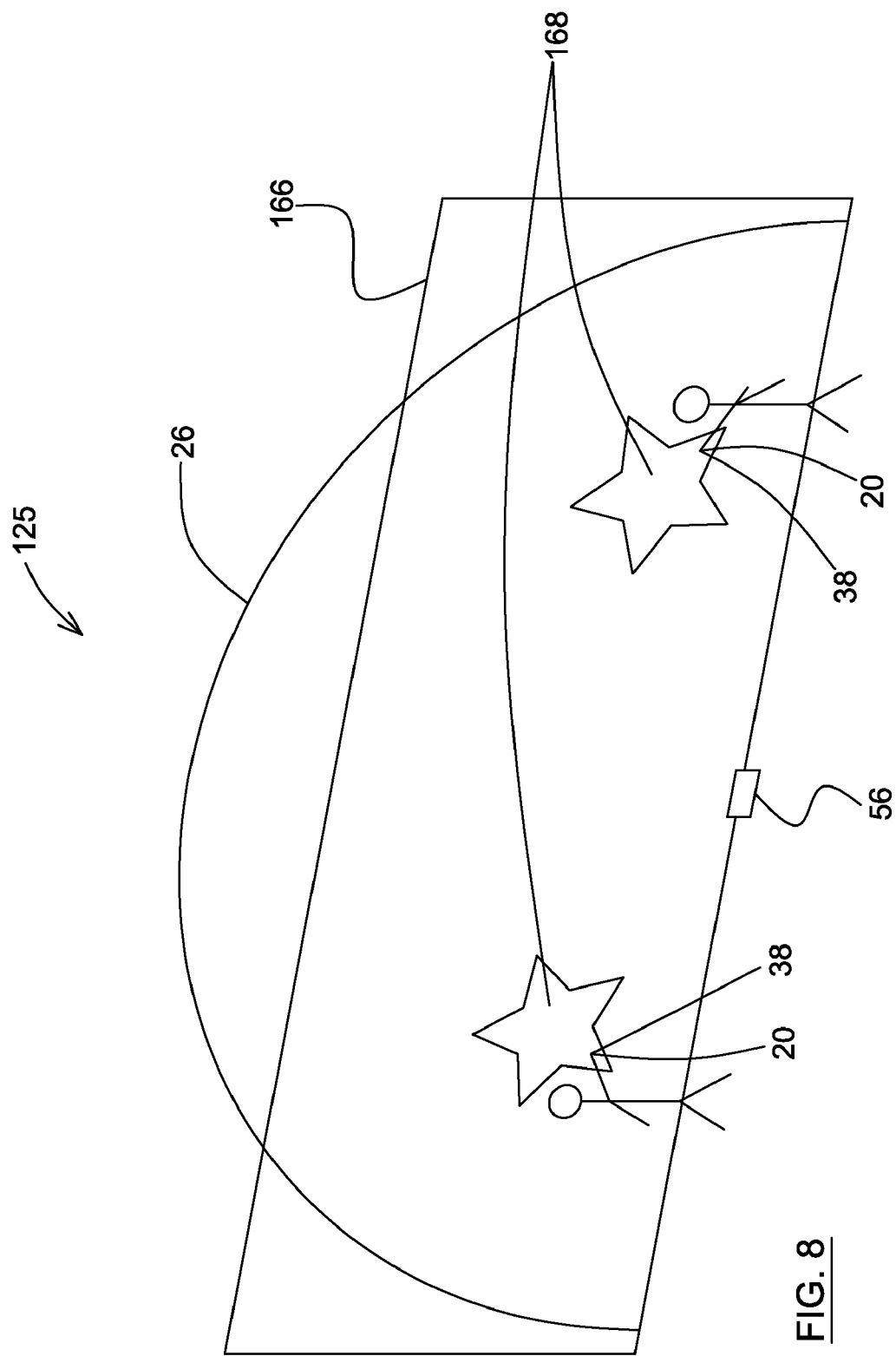
FIG. 8 is a schematic representation of the real-time tracking system according to another embodiment of the present invention, the system being shown applied to a substantially vertical screen.

Embodiments of the present invention may also be used for providing an interactive multi-touch screen, as shown in FIG. 8. A single scanner 56 is placed next to the wall or screen 166, so that the detection zone 68 is just in front of it. A shape analysis allows locating the hand of each individual interacting with the wall 166. Screen calibration is also used in this case in order to display objects or graphics 158 around the hands of the individuals.

It is to be understood that the method, according to embodiments of the present invention, may be provided with a variety of combinations of the above-described steps, as well as sequences thereof, as can be easily understood by a person skilled in the art.

The Real Time Tracking System and Components

According to another aspect of the present invention, and as better illustrated in the accompanying drawings, namely with reference to FIGS. 13a and 13b, there is provided a real-time tracking system 125 for tracking one or more objects in real-time within a physical space along a plane intersecting it.

The real-time tracking system 125 includes a scanning subsystem 126 for scanning the plane using a scanning beam, and for collecting reflection-distance data of the scanning beam as a function of position along the plane.

The system further includes a shape-analysis subsystem 128 operatively connected to the scanning subsystem 126 for receiving the reflection-distance data. The shape-analysis subsystem 128 includes a discontinuity-detection module 130 for processing at least a portion of the reflection-distance data to locate discontinuities. The shape-analysis subsystem 128 further includes an edge-detection module 132 operatively connected to the discontinuity-detection module 130 for associating the discontinuities with one or more detected object within the physical space, and determining positioning data for each one of the detected object based on positions of the corresponding discontinuities.

Preferably, the edge detection module is further enabled to generate at least one identified-object structure, each identified-object structure storing an object-id and object-tracking data corresponding to one of the one or more detected object. The shape-analysis subsystem 128 further includes a tracking-and-identification module 134 operatively connected to the edge detection module for associating, each detected object, if possible, to a matching-object structure among the at least one identified-object structure, through a comparison of the positioning data of the detected object with the object-tracking data of each identified-object structure, and for updating the object-tracking data of each matching-object structure based on the positioning data of the corresponding detected object.

Preferably, the scanning subsystem includes a scanning device for projecting the scanning beam at predetermined angles along the plane with respect to the scanning device. The scanning device is preferably an infrared transceiver for projecting and receiving an infrared light scanning beam. The infrared light scanning beam is preferably provided with a wavelength within the infrared light spectrum, which is advantageously invisible to the naked eye while being detected without significant pollution of the signal from ambient light. Alternatively, an ultrasonic device and/or any suitable device capable of emitting and sensing a punctual scanning beam may be used, as can be easily understood by a person skilled in the art. Moreover, the shape-analysis subsystem of the system is preferably processed by a CPU, a microchip, a microcontroller, an FPGA (Field-Programmable Gate Array) and/or any other computing or controlling device, such as a conventional computer, a mobile device, etc., as can be easily understood. The above-mentioned scanning subsystem may be remote or integral with respect to the shape-analysis subsystem or components thereof, as can be easily understood.

The shape-analysis subsystem preferably includes a plurality of modules and sub-modules for performing the steps of the method detailed above. Of course, one skilled in the art will readily understand that each module and submodule may be realized through a number of programming techniques and may in practice includes a plurality of routines and sub-routines enabling the desired functions desired.

More particularly, referring now to FIG. 13b, the shape-analysis subsystem 128 of the system preferably includes a detection-zone module 136 operatively connected to the discontinuity-detection module 130 to transmit thereto, for processing, selected-distance data among the reflection-distance data, corresponding to at least one detection zone in the plane.

Moreover, still with reference to FIG. 13b, the shape-analysis subsystem of the system preferably includes an exclusion-zone module 138 operatively connected to the discontinuity-detection module 130 for filtering from the reflection-distance data to be processed, excludible-distance data among the reflection-distance data, corresponding to at least one exclusion zone in the plane.

Moreover, still with reference to FIG. 13b, the shape-analysis subsystem of the system preferably includes a position-extrapolation module 140 operatively connected to the tracking-and-identification module 134 for identifying at least one undetected-object structure, each corresponding to one among the at least one identified-object structure, not having been associated by the tracking-and-identification module 134, and for updating by extrapolation each undetected-object structure, based on the stored object-tracking data.

Preferably, in the system, the positioning data of each detected object includes a detected-object radius and a detected-object absolute-position. Moreover, the object-tracking data of each identified-object structure preferably includes an identified-object radius corresponding to the detected-object radius of the corresponding detected object, an identified-object absolute-position corresponding to the detected-object absolute-position of the associated detected object and an identified-object detection-time corresponding to a detection-time parameter stored in memory. Moreover, the object-tracking data preferably includes a static-time parameter. Thus, still with reference to FIG. 13b, the shape-analysis subsystem 128 preferably includes a static-object-filtering module 142 for evaluating a variation of the corresponding identified-object absolute-position before and after update thereof, and for incrementing the static-time parameter if the variation is lesser than a minimal-displacement value. Preferably, a static object, that is to say, an object being associated to a corresponding static-time parameter exceeding a minimal-static-time value, is tagged, namely by marking the static-object parameter of the corresponding identified-object structure as being positive.

Preferably, referring now to FIG. 13a, the real-time tracking system 125 further includes a plug-in interface subsystem 144 operatively connected between the scanning subsystem 126 and the shape-analysis subsystem 128 for converting the reflection-distance data collected by the scanning subsystem 126 for processing by the shape-analysis subsystem 128, as can be easily understood and with reference to the previous explanations. The plugin-interface may include any suitable interface for converting and/or transmitting data between a scanning device 56 and a computing device, such as, for example, an RS 232 serial interface, an RS 424 serial interface, a USB interface, an Ethernet interface, etc., as can be easily understood. Preferably, a unified plug-in interface is provided for allowing easy support of multiple scanning hardware.

Preferably, referring still to FIG. 13a, the real-time tracking system 125 further includes an optical-screen-calibration subsystem 146 operatively connected to the shape-analysis subsystem 128 for receiving the at least one identified-object structure and for outputting at least one command for producing an effect based on the object-tracking data of the at least one identified-object structure, as can be easily understood and with reference to the previous explanations. Preferably, an identified-object structure having a static-object parameter value of one (1) or being marked positively, thus identifying a static object, is not processed by the optical-screen-calibration. Moreover, the optical-screen-calibration allows matching the object-tracking data with the physical location of the object, for example, by projecting visual effects to match the location and movement of the detected objects, as illustrated in FIGS. 11 and 12. More particularly, each position of each detection object is preferably scaled and offset to match the physical object onto which the interaction is displayed.

Moreover, referring still to FIG. 13a, the real-time tracking system 125 preferably further includes a network-broadcasting subsystem 148 operatively connected between the shape-analysis subsystem 128 and the optical-screen-calibration subsystem 146 for broadcasting at least a portion of the object-tracking data of the at least one identified-object structure via a network, as can be easily understood and with reference to the previous explanations. The network-broadcasting subsystem 148 may be provided with an Ethernet system, a light control protocol, such as DMX, or an electrical signal. Moreover, the network-broadcasting subsystem 148 or components thereof may be connected remotely, locally and/or integrally with another subsystem of the real-time tracking system 125 described herein. Typically, the network-broadcasting subsystem 148 provides transmission through an Ethernet network of data related to the detected objects, to one or several distant applications.

Moreover, referring still to FIG. 13a, the real-time tracking system 125 preferably further includes an interactive-setup subsystem 152 operatively connected to the optical-screen-calibration subsystem 146 for receiving the at least one command and for producing a physical effect in response to the at least one command, as can be easily understood and with reference to the previous explanations.

Moreover, the scanning subsystem 126 preferably includes a scanning device 56 configured, oriented and positioned to project the scanning beam along a substantially horizontal plane, as exemplified in FIG. 1.

Moreover, the scanning subsystem 126 preferably includes a scanning device 56 configured, oriented and positioned to project the scanning beam along a substantially horizontal plane, as exemplified in FIG. 8.

Moreover, referring now to FIGS. 10 to 12, the real-time tracking system 125 preferably further includes a plurality of scanning devices 56 for projecting corresponding scanning beams along a plurality of corresponding planes, as can be easily understood and with reference to the previous explanations.

Preferably, referring further to FIG. 13b the real-time tracking system 125 includes a data-merging module operatively connected to the tracking-and-identification module 134 for sequentially processing a plurality of sets of reflection-distance data, each set of reflection-distance data corresponding to one of the scanning devices 56, as can be easily understood and with reference to the previous explanations.

Moreover, according to embodiments of the present invention, a plurality of scanning devices 56 may be positioned, oriented and configured to project the scanning beams along at least two planes which may be substantially overlapping, substantially adjacent, substantially parallel, intersecting and/or any other suitable and desired configuration, as exemplified in the accompanying drawings and as can be easily understood and with reference to the previous explanations.

The real-time tracking system and/or method, according to embodiments of the present invention, is particularly advantageous in that it provides a highly reactive system, namely due to a high frequency position and movement detection. Moreover, and as previously explained, the system and method are directed to tracking of objects or persons, rather than mere presence detection thereof. As also described and exemplified herein, the system and/or method, according to embodiments of the present invention, is robust with respect to the environment being scanned, namely the presence of substances, such as smoke, or ambient light, or even to changes in lighting or movement of smoke, gases, etc. Also, embodiments of the present invention, are easily scalable. Moreover, the above-described system and method allow detecting a virtually unlimited number of objects and within a relatively large detection area.

Though the present invention is generally directed to the field of multimedia-scenography, the system and method for real-time tracking of objects described and claimed herein may be provided for a number of applications, such as for security and safety purposes, military environments, video or other games, toys, home entertainment/gaming systems, conference presentations, urban settings and developments, etc. and/or the like as can be easily understood and inferred herefrom.

Numerous other modifications could be made to the above-described real-time tracking system and method associated thereto, without departing from the scope of the present invention. The above-described embodiments are considered in all respect only as illustrative and not restrictive, and the present application is intended to cover any adaptations or variations thereof, as apparent to a person skilled in the art.

Of course, numerous other modifications could be made to the above-described embodiments without departing from the scope of the invention, as apparent to a person skilled in the art. Moreover, the many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method for real-time tracking of one or more object within a physical space, the method comprising:
   (a) scanning a plane using a scanning beam, said plane intersecting said physical space, and collecting reflection-distance data of said scanning beam as a function of position along said plane;
   (b) processing at least a portion of said reflection-distance data to locate discontinuities therein;
   (c) associating said discontinuities with one or more detected object within said physical space, and determining positioning data for each one of said detected object based on positions of the corresponding discontinuities; and
   (e) repeating steps (a) through (c) for a plurality of iterations.

2. The method according to claim 1, wherein step (a) comprises projecting the scanning beam from a scanning device along the plane at predetermined angles with respect to the scanning device.

3. The method according to claim 2, wherein the plurality of angles are provided within a delimited range of angles.

4. The method according to claim 3, wherein the plurality of angles are provided in half-degree)(0.5°) increments ranging from zero degree)(0°) to one-hundred-and-eighty degrees) (180°).

5. The method according to claim 2, wherein the reflection-distance data comprises distance values calculated based on a time-of-flight of the scanning beam being reflected against the one or more object, each distance value corresponding to one of the predetermined angles, and wherein the processing of step (b) comprises:
   sequentially reading the distance-values, the distance-values being sorted based on an ascending order of the corresponding predetermined angles, and while sequentially reading:
   identifying said discontinuities at a first one of said distance values, and where two successive distance-values being read differ by greater than a maximum-gap value; and
   generating, at each one of said discontinuities, a list and storing therein each distance-value being read.

6. The method according to claim 5, wherein the associating of step (c) comprises associating each generated list to one of the one or more detected object.

7. The method according to claim 1, wherein the plane comprises at least one detection zone within the physical space, the method further comprising, at step (b), identifying selected-distance data among the reflection-distance data, corresponding to the at least one detection zone, and processing only the selected-distance data.

8. The method according to claim 1, wherein the plane comprises at least one exclusion zone within the physical space, the method further comprising, at step (b), identifying excludible-distance data in the reflection-distance data, corresponding to each of said at least one exclusion zone, and filtering out the excludible-distance data from the reflection-distance data.

9. The method according to claim 1, wherein the positioning data of each detected object comprises a detected-object radius and a detected-object absolute-position, the method further comprising, at step (c), for each detected object:
   evaluating the detected-object radius based on positions of the corresponding discontinuities;
   evaluating the detected-object absolute-position corresponding substantially to the centroid of the detected object with respect to a common reference; and
   storing in memory a detection-time parameter, corresponding to a time of detection associated to the one or more detected object for one of the iterations.

10. The method according to claim 9, further comprising, at step (c), for each detected object, filtering out the detected object if the detected-object radius is inferior to a minimal-radius-threshold.

11. The method according to claim 1, wherein the plane is substantially horizontal.

12. The method according to claim 1, wherein the plane is substantially vertical.

13. The method according to claim 1, wherein the plane corresponds to a screen.

14. The method according to claim 1, wherein repeating of steps (a) to (c) comprises repeating step (a) for a plurality of said planes, each of said planes corresponding to one of the iterations.

15. The method according to claim 14, wherein repeating of steps (a) to (c) further comprises repeating for a recurring sequence of the plurality of planes.

16. The method according to claim 14, wherein step (a) comprises, for each of the iterations, projecting the scanning beam, along one of the planes, from a distinct corresponding scanning device.

17. The method according to claim 14, wherein at least two of the plurality of planes are overlapping.

18. The method according to claim 14, wherein at least two of the plurality of planes are substantially adjacent.

19. The method according to claim 14, wherein at least two of the plurality of planes are substantially parallel with respect to one another.

20. The method according to claim 14, wherein at least two of the plurality of planes intersect.

21. The method according to claim 1, further comprising, prior to step (b), a step of converting the reflection-distance data for the processing of step (b).

22. The method according to claim 1, further comprising a step of broadcasting at least a portion of the positioning data of the one or more detected object via a network.

23. The method according to claim 1, further comprising a step of outputting at least one command for producing an effect based on the positioning data of the one or more detected object.

24. The method according to claim 23, further comprising a step of producing a physical effect in response to the at least one command.

25. The method according to claim 1, further comprising, prior to step (e):
   (d) for each detected object, assigning an object-id, and generating an identified-object structure storing said object-id and object-tracking data based on the positioning data of the detected object, thereby defining at least one identified-object structure;
   and wherein, step (e) further comprises, after each iteration, performing steps of, for each detected object:
   (i) associating, if possible, a matching-object structure among the at least one identified-object structure, through a comparison of the positioning data of said detected object with the object-tracking data of each identified-object structure, and
   (ii) for each matching-object structure, updating the object-tracking data based on the positioning data of the corresponding detected object.

26. The method according to claim 25, wherein the positioning data of each detected object comprises a detected-object radius and a detected-object absolute-position, the method further comprising, at step (c), for each detected object:

evaluating the detected-object radius based on positions of the corresponding discontinuities;

evaluating the detected-object absolute-position corresponding substantially to the centroid of the detected object with respect to a common reference; and storing in memory a detection-time parameter, corresponding to a time of detection associated to the one or more detected object for one of the iterations.

27. The method according to claim 26, wherein the object-tracking data comprises an identified-object radius and an identified-object absolute-position corresponding to the detected-object absolute-position of the associated detected object and an identified-object detection-time corresponding to the detection-time parameter stored in memory.

28. The method according to claim 27, wherein the object-tracking data comprises an identified-object relative-position corresponding to the detected-object absolute-position of the associated detected object, with respect to a relative reference.

29. The method according to claim 27, wherein the object-tracking data comprises speed data, wherein the updating step (ii) comprises updating the speed data based on a calculation of a displacement as a function of a duration, the displacement corresponding to a variation of the identified-object absolute-position before and after update thereof, and the duration corresponding to a variation of identified-object detection-time before and after update thereof.

30. The method according to claim 27, wherein the associating step (i) comprises, for each detected object:

(1) evaluating each offset between the identified-object absolute-position of each identified-object structure and the detected-object absolute-position of the detected object in order to identify a smallest offset; and (2) associating the detected object with the matching-object structure corresponding to the identified-object structure associated with the smallest offset.

31. The method according to claim 30, wherein the associating step (2) is conditional to the smallest offset being inferior to a maximal-match-distance.

32. The method according to claim 25, wherein the updating step (ii) comprises, smoothing the object-tracking data by low-pass filter based on the previously stored object-tracking data.

33. The method according to claim 27, wherein the object-tracking data includes a static-time parameter, the method further comprising, at step (e):

for each identified-object structure, evaluating a variation of the corresponding identified-object absolute-position before and after update thereof; and if the variation is lesser than a minimal-displacement value, incrementing the static-time parameter.

34. The method according to claim 33, wherein the object-tracking data includes a static-object parameter, the method further comprising, at step (e):

for each identified-object structure, if the corresponding static-time parameter exceeds a minimal-static-time value, marking the static-object parameter as being positive.

35. The method according to claim 25, wherein the object-tracking data comprises an alive-time parameter, the method further comprising at step (ii), for each matched-object structure, incrementing the corresponding alive-time parameter.

36. The method according to claim 25, further comprising at step (e):

identifying at least one new-detected object, each corresponding to one among the one or more detected object, not having been associated at step (i); and generating, for each new-detected object, a new identified-object structure storing corresponding a new object-id and new object-tracking data based on the positioning data of the new-detected object.

37. The method according to claim 25, further comprising, at step (e):

identifying at least one undetected-object structure, each corresponding to one among the at least one identified-object structure, not having been associated at step (i); and for each undetected-object structure, updating the object-tracking data by extrapolation based on the stored object-tracking data.

38. The method according to claim 37, wherein the object-tracking data includes a dead-time parameter, the method further comprising at step (e):

for each undetected-object structure, incrementing the corresponding dead-time parameter; and if the dead-time parameter exceeds a maximum dead-time value, deleting the undetected-object structure.

39. The method according to claim 25, wherein the plane is substantially horizontal.

40. The method according to claim 25, wherein the plane is substantially vertical.

41. The method according to claim 25, wherein the plane corresponds to a surface of a screen.

42. The method according to claim 25, wherein repeating of step (e) comprises repeating step (a) for a plurality of said planes, each of said planes corresponding to one of the iterations.

43. The method according to claim 42, wherein repeating of step (e) comprises repeating for a recurring sequence of the plurality of planes.

44. The method according to claim 42, wherein step (a) comprises, for each of the iterations, projecting the scanning beam, along one of the planes, from a distinct corresponding scanning device.

45. The method according to claim 42, wherein at least two of the plurality of planes are overlapping.

46. The method according to claim 42, wherein at least two of the plurality of planes are substantially adjacent.

47. The method according to claim 42, wherein at least two of the plurality of planes are substantially parallel with respect to one another.

48. The method according to claim 42, wherein at least two of the plurality of planes intersect.

49. The method according to claim 25, further comprising, prior to step (b), a step of converting the reflection-distance data for the processing of step (b).

50. The method according to claim 25, further comprising a step of broadcasting at least a portion of the object-tracking data of the at least one identified-object structure via a network.

51. The method according to claim 25, further comprising a step of outputting at least one command for producing an effect based on the object-tracking data of the at least one identified-object structure.

52. The method according to claim 51, further comprising a step of producing a physical effect in response to the at least one command.

53. A real-time tracking system for tracking one or more objects in real-time within a physical space along a plane intersecting thereaccross, the real-time tracking system comprising:

a scanning subsystem for scanning the plane using a scanning beam, and for collecting reflection-distance data of said scanning beam as a function of position along said plane; and a shape-analysis subsystem operatively connected to the scanning subsystem for receiving therefrom the reflection-distance data, the shape-analysis subsystem comprising:

a discontinuity-detection module for processing at least a portion of said reflection-distance data to locate discontinuities therealong; and an edge-detection module operatively connected to the discontinuity detection module for associating said discontinuities with one or more detected object within said physical space, and determining positioning data for each one of said detected object based on positions of the corresponding discontinuities; the edge detection module being further enabled to generate at least one identified-object structure, each identified-object structure storing an object-id and object-tracking data corresponding to one of the one or more detected object.

54. The real-time tracking system according to claim 53, wherein the scanning subsystem comprises a scanning device for projecting the scanning beam at predetermined angles along the plane with respect to the scanning device.

55. The real-time tracking system according to claim 54, wherein the scanning device comprises an infrared transceiver for projecting and receiving an infrared light scanning beam.

56. The real-time tracking system according to claim 53, wherein the shape-analysis subsystem comprises a detection-zone module operatively connected to the discontinuity-detection module to transmit thereto, for processing, selected-distance data among the reflection-distance data, corresponding to at least one detection zone in the plane.

57. The real-time tracking system according to claim 53, wherein the shape-analysis subsystem comprises an exclusion-zone module operatively connected to the discontinuity-detection module for filtering from the reflection-distance data to be processed, excludible-distance data among the reflection-distance data, corresponding to at least one exclusion zone in the plane.

58. The real-time tracking system according to claim 53, wherein the positioning data of each detected object comprises a detected-object radius and a detected-object absolute-position.

59. The real-time tracking system according to claim 53, further comprising a plug-in interface subsystem operatively connected between the scanning subsystem and the shape-analysis subsystem for converting the reflection-distance data collected by the scanning subsystem for processing by the shape-analysis subsystem.

60. The real-time tracking system according to claim 53, further comprising an optical-screen-calibration subsystem operatively connected to the shape-analysis subsystem for receiving the one or more detected object and for outputting at least one command for producing an effect based on the positioning data of the one or more detected object.

61. The real-time tracking system according to claim 60, further comprising a network-broadcasting subsystem operatively connected between the shape-analysis subsystem and the optical-screen-calibration subsystem for broadcasting at least a portion of the positioning data of the one or more detected object via a network.

62. The real-time tracking system according to claim 60, further comprising an interactive-setup subsystem operatively connected to the optical-screen-calibration subsystem for receiving the at least one command and for producing a physical effect in response to the at least one command.

63. The real-time tracking system according to claim 53, wherein the plane is substantially horizontal and the scanning device is configured, oriented and positioned to project the scanning beam along said substantially horizontal plane.

64. The real-time tracking system according to claim 53, wherein the plane is substantially vertical and the scanning device is configured, oriented and positioned to project the scanning beam along said substantially vertical plane.

65. The real-time tracking system according to claim 53, wherein the scanning subsystem comprises a plurality of said scanning devices for projecting corresponding scanning beams along a plurality of corresponding planes.

66. The real-time tracking system according to claim 65, wherein the plurality of scanning devices are positioned, oriented and configured to project the scanning beams along at least two substantially overlapping planes.

67. The real-time tracking system according to claim 65, wherein the plurality of scanning devices are positioned, oriented and configured to project the scanning beams along at least two substantially adjacent planes.

68. The real-time tracking system according to claim 65, wherein the plurality of scanning devices are positioned, oriented and configured to project the scanning beams along at least two substantially parallel planes.

69. The real-time tracking system according to claim 65, wherein the plurality of scanning devices are positioned, oriented and configured to project the scanning beams along at least two intersecting planes.

70. The real-time tracking system according to claim 53, wherein the shape analysis subsystem further comprises:

a tracking-and-identification module operatively connected to the edge detection module for associating, each detected object, if possible, to a matching-object structure among the at least one identified-object structure, through a comparison of the positioning data of said detected object with the object-tracking data of each identified-object structure, and for updating the object-tracking data of each matching-object structure based on the positioning data of the corresponding detected object.

71. The real-time tracking system according to claim 70, wherein the object-tracking data of each identified-object structure comprises an identified-object radius corresponding to the detected-object radius of the corresponding detected object, an identified-object absolute-position corresponding to the detected-object absolute-position of the associated detected object and an identified-object detection-time corresponding to a detection-time parameter stored in memory.

72. The real-time tracking system according to claim 71, wherein the object-tracking data of each identified-object structure comprises a static-time parameter, and wherein the shape-analysis subsystem comprises a static-object-filtering module for evaluating a variation of the corresponding identified-object absolute-position before and after update thereof, for incrementing the static-time parameter if the variation is lesser than a minimal-displacement value, and for marking the static-object parameter as being positive if the corresponding static-time parameter exceeds a minimal-static-time value.

73. The real-time tracking system according to claim 70, wherein the shape-analysis subsystem comprises a position-extrapolation module operatively connected to the tracking-and-identification module for identifying at least one undetected-object structure, each corresponding to one among the at least one identified-object structure, not having been associated by the tracking-and-identification module, and for updating by extrapolation each undetected-object structure, based on the stored object-tracking data.

74. The real-time tracking system according to claim 70, further comprising a plug-in interface subsystem operatively connected between the scanning subsystem and the shape-analysis subsystem for converting the reflection-distance data collected by the scanning subsystem for processing by the shape-analysis subsystem.

75. The real-time tracking system according to claim 70, further comprising an optical-screen-calibration subsystem operatively connected to the shape-analysis subsystem for receiving the at least one identified-object structure and for outputting at least one command for producing an effect based on the object-tracking data of the at least one identified-object structure.

76. The real-time tracking system according to claim 75, further comprising a network-broadcasting subsystem operatively connected between the shape-analysis subsystem and the optical-screen-calibration subsystem for broadcasting at least a portion of the object-tracking data of the at least one identified-object structure via a network.

77. The real-time tracking system according to claim 75, further comprising an interactive-setup subsystem operatively connected to the optical-screen-calibration subsystem for receiving the at least one command and for producing a physical effect in response to the at least one command.

78. The real-time tracking system according to claim 70, wherein the plane is substantially horizontal and the scanning device is configured, oriented and positioned to project the scanning beam along said substantially horizontal plane.

79. The real-time tracking system according to claim 70, wherein the plane is substantially vertical and the scanning device is configured, oriented and positioned to project the scanning beam along said substantially vertical plane.

80. The real-time tracking system according to claim 70, wherein the scanning subsystem comprises a plurality of said scanning devices for projecting corresponding scanning beams along a plurality of corresponding planes.

81. The real-time tracking system according to claim 80, wherein the shape-analysis subsystem comprises a data-merging module operatively connected to the tracking-and-identification module for sequentially processing a plurality of sets of reflection-distance data, each set of reflection-distance data corresponding to one of said scanning devices.

82. The real-time tracking system according to claim 80, wherein the plurality of scanning devices are positioned, oriented and configured to project the scanning beams along at least two substantially overlapping planes.

83. The real-time tracking system according to claim 80, wherein the plurality of scanning devices are positioned, oriented and configured to project the scanning beams along at least two substantially adjacent planes.

84. The real-time tracking system according to claim 80, wherein the plurality of scanning devices are positioned, oriented and configured to project the scanning beams along at least two substantially parallel planes.

85. The real-time tracking system according to claim 80, wherein the plurality of scanning devices are positioned, oriented and configured to project the scanning beams along at least two intersecting planes.

* * * * *